(12) United States Patent
Kimura et al.

(10) Patent No.: US 8,021,573 B2
(45) Date of Patent: Sep. 20, 2011

(54) NEAR-INFRARED-ABSORBING MATERIAL AND NEAR-INFRARED-ABSORBING FILTER

(75) Inventors: Keizo Kimura, Odawara (JP);
Katsuyoshi Yamakawa, Odawara (JP);
Osamu Uchida, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 306 days.

(21) Appl. No.: 11/845,130

(22) Filed: Aug. 27, 2007

(65) Prior Publication Data

US 2008/0067479 A1 Mar. 20, 2008

(30) Foreign Application Priority Data

Sep. 14, 2006 (JP) .................. 2006-249032

(51) Int. Cl.
*G02B 5/22* (2006.01)
*C09K 11/06* (2006.01)
*C07C 251/30* (2006.01)

(52) U.S. Cl. .............. 252/301.16; 428/690; 252/301.21; 252/301.23; 252/301.28; 252/301.32; 252/587

(58) Field of Classification Search ... 252/301.16–301.6 F, 587
See application file for complete search history.

(56) References Cited

U.S. PATENT DOCUMENTS

| | | | | |
|---|---|---|---|---|
| 3,366,575 A | * | 1/1968 | Nobujiro et al. | 252/301.24 |
| 4,751,020 A | * | 6/1988 | Marten et al. | 252/301.21 |
| 4,960,538 A | | 10/1990 | Itoh et al. | |
| 5,024,926 A | | 6/1991 | Itoh et al. | |
| 5,106,989 A | * | 4/1992 | Kubbota et al. | 548/220 |
| 6,866,795 B2 | * | 3/2005 | Usami et al. | 252/301.35 |

FOREIGN PATENT DOCUMENTS

| | | |
|---|---|---|
| JP | 2-4865 A | 1/1990 |
| JP | 11-167350 A | 6/1999 |
| JP | 11-323311 * | 11/1999 |
| JP | 2001-133624 A | 5/2001 |
| JP | 2005-181966 A | 7/2005 |
| JP | 2005-221891 * | 8/2005 |

OTHER PUBLICATIONS

Siegrist et al. "Optical Brightener", Ullmann's Encyclopedia of Industrial Chemistry, Jan. 15, 2003, pp. 1-24.*

* cited by examiner

*Primary Examiner* — C. Melissa Koslow
(74) *Attorney, Agent, or Firm* — Sughrue Mion, PLLC

(57) ABSTRACT

The present invention provides a near-infrared-absorbing material including: a luminescent agent, and a near-infrared-absorbing compound obtained by oxidizing a compound represented by the following formula (II):

Formula (II)

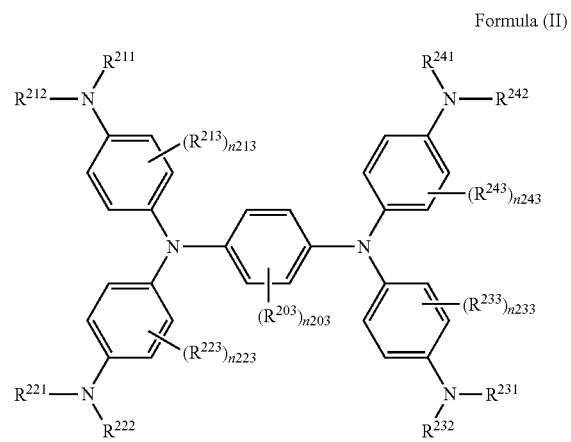

wherein $R^{211}$, $R^{212}$, $R^{221}$, $R^{222}$, $R^{231}$, $R^{232}$, $R^{241}$ and $R^{242}$ each independently represent a hydrogen atom, an aliphatic group or an aromatic group; $R^{203}$, $R^{213}$, $R^{223}$, $R^{233}$ and $R^{243}$ each independently represent a substituent group; and $n_{203}$, $n_{213}$, $n_{223}$, $n_{233}$ and $n_{243}$ each independently represent an integer from 0 to 4.

18 Claims, No Drawings

NEAR-INFRARED-ABSORBING MATERIAL AND NEAR-INFRARED-ABSORBING FILTER

CROSS-REFERENCE TO RELATED APPLICATION

This application claims priority under 35 USC 119 from Japanese Patent Application No. 2006-249032, the disclosure of which is incorporated by reference herein.

BACKGROUND OF THE INVENTION

1. Field of the Invention

The present invention relates to a near-infrared-absorbing material suitable for use in the optoelectronics-related field, and to a near-infrared-absorbing filter using the same.

2. Description of Related Art

Various optoelectronic products, such as near-infrared-absorbing filters, use near-infrared-absorbing dyes that absorb infrared rays without substantially absorbing visible rays.

Depending on the conditions under which they are used, these optoelectronic products may be subjected to high temperature, high humidity or light irradiation, causing problematic decomposition of the near-infrared-absorbing dye contained therein.

Known techniques for improving resistance to such decomposition factors include changing the structure of the dye. For example, it is disclosed that a naphthalocyanine dye having a specific structure has excellent resistance properties (see, for example, Japanese Patent Laid-Open (JP-A) No. 2-4865, U.S. Pat. Nos. 4,960,538 and 5,024,926).

Techniques which involve using a near-infrared-absorbing dye in combination with an ultraviolet-absorbing material, thereby preventing decomposition due to light irradiation are also known (see, for example, JP-A No. 11-167350, JP-A No. 2001-133624, and JP-A No. 2005-181966).

However, the naphthalocyanine dye described above does not achieve a satisfactory balance between physical properties such as absorption wavelength and solubility, and is easily photodecomposed. Further, using the near-infrared-absorbing dye in combination with the ultraviolet-absorbing material is insufficient to prevent decomposition, and thus there is a demand for techniques that further improve resistance to light.

Accordingly, there is a need for a near-infrared-absorbing material that has excellent light resistance and invisibility, and is not prone to discoloration after photo-deterioration, and for a near-infrared-absorbing filter using the same.

Further, there is a need for a near-infrared-absorbing material that can be applied to optoelectronics-related fields, including application for near-infrared-absorbing filters, near-infrared-absorbing colored resin compositions, liquid crystal display elements, optical memory cards, optical recording media, and protective glasses.

SUMMARY OF THE INVENTION

The present invention provides a near-infrared-absorbing material including at least one luminescent agent (also referred to hereinafter as compound (1-a)) and at least one near-infrared-absorbing compound (also referred to hereinafter as compound (XII-a)) obtained by oxidizing a compound represented by the following formula (II):

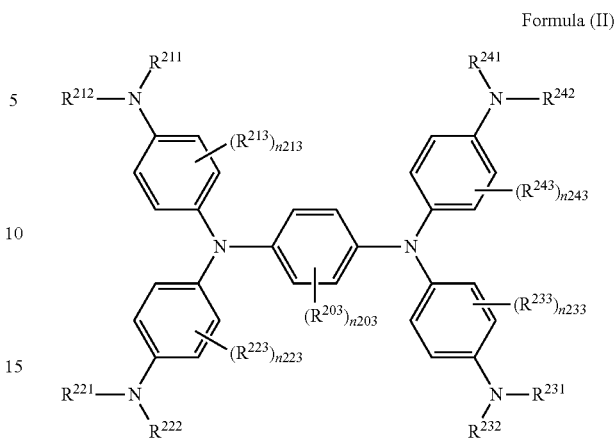

Formula (II)

wherein $R^{211}$, $R^{212}$, $R^{221}$, $R^{222}$, $R^{231}$, $R^{232}$, $R^{241}$ and $R^{242}$ each independently represent a hydrogen atom, an aliphatic group or an aromatic group, $R^{203}$, $R^{213}$, $R^{223}$, $R^{233}$ and $R^{243}$ each independently represent a substituent group, and $n_{203}$, $n_{213}$, $n_{223}$, $n_{233}$ and $n_{243}$ each independently represent an integer from 0 to 4.

A second aspect of the invention is a near-infrared-absorbing filter obtained by using the near-infrared-absorbing material described above.

DETAILED DESCRIPTION OF THE INVENTION

Hereinafter, embodiments of the near-infrared-absorbing material of the present invention and a near-infrared-absorbing filter using the same are described in detail.

In the invention, the luminescent agent (compound (I-a)) is an inorganic or organic compound which absorbs light of certain wavelength (for example, light of from spectral absorption maximum wavelength to 400 nm) and emits light of longer wavelength than that of the absorbed light. This luminescent agent is preferably a fluorogenic agent, and more preferably an organic fluorogenic agent.

The peak wavelength (spectral absorption maximum wavelength) of an emission spectrum of the light of longer wavelength emitted by the luminescent agent upon light absorption varies depending on a simultaneously used near-infrared-absorbing compound (compound (XII-a)) described later. Generally, the peak wavelength is preferably a wavelength in the range of 300 to 700 nm. For preferable overlapping of the emission spectrum with the subsidiary absorption of the near-infrared-absorbing dye, the peak wavelength is more preferably a wavelength in the range of 350 to 620 nm, still more preferably in the range of 370 to 570 nm and most preferably in the range of 400 to 550 nm. In order that the wavelength range of this peak wavelength is in these ranges, the luminescent agent used in combination with the near-infrared-absorbing compound is preferably a compound represented by any one of the formulae (I-1) to (I-4) described later.

The spectral absorption maximum wavelength can be confirmed by using a solution obtained by dissolving the compound (I-a) and compound (XII-a) in an organic or inorganic solvent, in water or in a mixed solvent thereof.

Examples of the organic solvent include amide solvents (for example, N,N-dimethylformamide, N,N-dimethylacetamide, and 1-methyl-2-pyrrolidone), sulfone solvents (for example, sulfolane), sulfoxide solvents (for example, dimethylsulfoxide), ureido solvents (for example, tetramethylurea), ether solvents (for example, dioxane, tetrahydrofuran, and cyclopentyl methyl ether), ketone solvents (for example, acetone and cyclohexanone), hydrocarbon solvents (for example, toluene, xylene, and n-decane), halogenated solvents (for example, tetrachloroethane, chlorobenzene, and chloronaphthalene), alcohol solvents (for example, methanol, ethanol, isopropyl alcohol, ethylene glycol, cyclohexanol, and phenol), pyridine solvents (for example, pyridine, γ-picoline, and 2,6-lutidine), ester solvents (for example, ethyl acetate and butyl acetate), carboxylic acid solvents (for example, acetic acid and propionic acid), nitrile solvents (for example, acetonitrile), sulfonic acid solvents (for example, methanesulfonic acid) and amine solvents (for example, triethylamine and tributylamine). Examples of the inorganic solvent include sulfuric acid and phosphoric acid.

Preferable among these solvents in consideration of solubility are amide solvents, sulfone solvents, sulfoxide solvents, ureido solvents, ether solvents, ketone solvents, halogenated solvents, alcohol solvents, ester solvents and nitrile solvents for the compound (I-a). Amide solvents, sulfone solvents, sulfoxide solvents, ureido solvents, ether solvents, hydrocarbon solvents, halogenated solvents, sulfonic acid solvents, and sulfuric acid are preferable for the compound (XII-a).

The concentration of the compound when its spectral absorption maximum wavelength is measured may be a concentration at which the spectral absorption maximum wavelength can be confirmed. Preferably, the concentration is in the range of $1 \times 10^{-13}$ to $1 \times 10^{-7}$. The temperature is not particularly limited and is preferably 0 to 80° C., and, unless the solubility of the compound is problematic, more preferably room temperature (25° C.).

As a measuring instrument for measuring the spectral absorption maximum wavelength, a usual spectral absorption measuring instrument (for example, U-4100 spectrophotometer manufactured by Hitachi High Technologies) can be used.

—With Respect to Groups—

Before the luminescent agent and the near-infrared-absorbing compound in the invention are described in detail, the groups in the formulae shown in connection therewith will be described.

The aliphatic group in the present specification means an alkyl group, a substituted alkyl group, an alkenyl group, a substituted alkenyl group, an alkynyl group, a substituted alkynyl group, an aralkyl group and a substituted aralkyl group. The alkyl group may be a branched or cyclic group. The number of carbon atoms in the alkyl group is preferably 1 to 20, and more preferably 1 to 18. The alkyl moiety of the substituted alkyl group is the same as the above alkyl group. The alkenyl group may be a branched or cyclic group. The number of carbon atoms in the alkenyl group is preferably 2 to 20, and more preferably 2 to 18. The alkenyl moiety of the substituted alkenyl group is the same as the above alkenyl group. The alkynyl group may be a branched or cyclic group. The number of carbon atoms in the alkynyl group is preferably 2 to 20, and more preferably 2 to 18. The alkynyl moiety of the substituted alkynyl group is the same as the above alkynyl group. The alkyl moiety of the aralkyl group and substituted aralkyl group is the same as the above alkyl group. The aryl moiety of the aralkyl group and substituted aralkyl group is the same as an aryl group described later.

"Examples of substituent groups in the substituted alkyl group, in the substituted alkenyl group, in the substituted alkynyl group and in the alkyl moiety of the substituted aralkyl group" include halogen atoms (for example, a chlorine atom, a bromine atom, and an iodine atom), alkyl groups [straight-chain, branched, or cyclic substituted or unsubstituted alkyl group; specific examples thereof include alkyl groups (preferably alkyl groups having 1 to 30 carbon atoms, such as methyl, ethyl, n-propyl, isopropyl, t-butyl, n-octyl, eicosyl, 2-chloroethyl, 2-cyanoethyl, and 2-ethylhexyl groups), cycloalkyl groups (preferably, substituted or unsubstituted cycloalkyl groups having 3 to 30 carbon atoms, such as cyclohexyl, cyclopentyl, and 4-n-dodecylcyclohexyl groups), bicycloalkyl groups (preferably, substituted or unsubstituted bicycloalkyl groups having 5 to 30 carbon atoms, that is, monovalent groups obtained by removing one hydrogen atom from bicycloalkane having 5 to 30 carbon atoms, such as bicyclo[1,2,2]heptan-2-yl and bicyclo[2,2,2]octan-3-yl groups), and tricycle structures containing more cyclic structures; and the alkyl group in a substituent group described below (for example, the alkyl group in an alkylthio group) has the same meaning], alkenyl groups [straight-chain, branched or cyclic substituted or unsubstituted alkenyl groups; including alkenyl groups (including preferably, substituted or unsubstituted alkenyl groups having 2 to 30 carbon atoms, such as vinyl, allyl, prenyl, geranyl, and oleyl groups), cycloalkenyl groups (preferably, substituted or unsubstituted cycloalkenyl groups having 3 to 30 carbon atoms, that is, monovalent groups obtained by removing one hydrogen atom from cycloalkene having 3 to 30 carbon atoms, such as 2-cyclopenten-1-yl and 2-cyclohexen-1-yl groups), and bicycloalkenyl groups (substituted or unsubstituted bicycloalkenyl groups, preferably substituted or unsubstituted bicycloalkenyl groups having 5 to 30 carbon atoms, that is, monovalent groups obtained by removing one hydrogen atom from bicycloalkene having one double bond, for example, bicyclo[2,2,1]hept-2-en-1-yl and bicyclo[2,2,2]oct-2-en-4-yl groups)], alkynyl groups (preferably, substituted or unsubstituted alkynyl groups having 2 to 30 carbon atoms, such as ethynyl, propargyl, and trimethylsilylethynyl groups), aryl groups (preferably, substituted or unsubstituted aryl groups having 6 to 30 carbon atoms, such as phenyl, p-tolyl, naphthyl, m-chlorophenyl, and o-hexadecanoylaminophenyl), heterocyclic groups (preferably monovalent groups obtained by removing one hydrogen atom from five- or six-membered substituted or unsubstituted, aromatic or non-aromatic heterocyclic compounds, more preferably, five- or six-membered heteroaromatic ring groups having 3 to 30 carbon atoms, such as 1-pyrazolyl, 2-furyl, 2-thienyl, 2-pyrimidinyl, and 2-benzothiazolyl groups), a cyano group, a hydroxyl group, a nitro group, a carboxyl group, alkoxy groups (preferably, substituted or unsubstituted alkoxy groups having 1 to 30 carbon atoms, such as methoxy, ethoxy, isopropoxy, t-butoxy, n-octyloxy, and 2-methoxyethoxy groups), aryloxy groups (preferably, substituted or unsubstituted aryloxy groups having 6 to 30 carbon atoms, such as phenoxy, 2-methylphenoxy, 4-t-butylphenoxy, 3-nitrophenoxy, and 2-tetradecanoylaminophenoxy groups), silyloxy groups (preferably silyloxy groups having 3 to 20 carbon atoms, such as trimethylsilyloxy and t-butyldimethylsilyloxy groups), heterocyclic oxy groups (preferably, substituted or unsubstituted heterocyclic oxy groups having 2 to 30 carbon atoms, such as 1-phenyltetrazole-5-oxy and 2-tetrahydropyranyloxy groups), acyloxy groups (preferably, a formyloxy group, substituted or unsubstituted alkylcarbonyloxy groups having 2 to 30 carbon atoms, and substituted or unsubstituted arylcarbonyloxy groups having 6 to 30 carbon atoms, such as formyloxy, acetyloxy, pivaloyloxy, stearoyloxy, benzoyloxy, and p-methoxyphenylcarbonyloxy groups), carbamoyloxy groups (preferably, substituted or unsubstituted carbamoyloxy group having 1 to 30 carbon atoms, such as N,N-dimethylcarbamoyloxy, N,N-diethylcarbamoyloxy, morpholinocarbonyloxy, N,N-di-n-octylaminocarbonyloxyl, and N-n-octylcarbamoyloxy groups), alkoxycarbonyloxy groups (preferably, substituted or unsubstituted alkoxycarbonyloxy groups having 2 to 30 carbon atoms, such as methoxycarbonyloxy, ethoxycarbonyloxy, t-butoxycarbonyloxy, and n-octylcarbonyloxy groups), aryloxycarbonyloxy groups (preferably, substituted or unsubstituted aryloxycarbonyloxy groups having 7 to 30 carbon atoms, such as phenoxycarbonyloxy, p-methoxyphenoxycarbonyloxy, and p-n-hexadecyloxyphenoxycarbonyloxy groups), amino groups (preferably, an amino group, substituted or unsubstituted alkylamino groups having 1 to 30 carbon atoms, and substituted or unsubstituted anilino groups having 6 to 30 carbon atoms, such as amino, methylamino, dimethylamino, anilino, N-methyl-anilino, and diphenylamino groups), acylamino groups (preferably, a formylamino group, substituted or unsubstituted alkylcarbonylamino groups having 1 to 30 carbon atoms, and substituted or unsubstituted arylcarbonylamino groups having 6 to 30 carbon atoms, such as formylamino, acetylamino, pivaloylamino, lauroylamino, benzoylamino, and 3,4,5-tri-n-octyloxyphenylcarbonylamino groups), aminocarbonylamino groups (preferably, substituted or unsubstituted aminocarbonylamino groups having 1 to 30 carbon atoms, such as carbamoylamino, N,N-dimethylaminocarbonylamino, N,N-diethylaminocarbonylamino, and morpholinocarbonylamino groups), alkoxycarbonylamino groups (preferably, substituted or unsubstituted alkoxycarbonylamino groups having 2 to 30 carbon atoms, such as methoxycarbonylamino, ethoxycarbonylamino, t-butoxycarbonylamino, n-octadecyloxycarbonylamino, and N-methyl-methoxycarbonylamino groups), aryloxycarbonylamino groups (preferably, substituted or unsubstituted aryloxycarbonylamino groups having 7 to 30 carbon atoms, such as phenoxycarbonylamino, p-chlorophenoxycarbonylamino, and m-n-octyloxyphenoxycarbonylamino groups), sulfamoylamino groups (preferably, substituted or unsubstituted sulfamoylamino groups having 0 to 30 carbon atoms, such as sulfamoylamino, N,N-dimethylaminosulfonylamino, and N-n-octylaminosulfonylamino groups), alkyl- and aryl-sulfonylamino groups (preferably, substituted or unsubstituted alkylsulfonylamino groups having 1 to 30 carbon atoms, and substituted or unsubstituted arylsulfonylamino groups having 6 to 30 carbon atoms, such as methoxysulfonylamino, butylsulfonylamino, phenylsulfonylamino, 2,3,5-trichlorophenylsulfonylamino, and p-methylphenylsulfonylamino groups), a mercapto group, alkylthio groups (preferably, substituted or unsubstituted alkylthio groups having 1 to 30 carbon atoms, such as methylthio, ethylthio, and n-hexadecylthio groups), arylthio groups (preferably, substituted or unsubstituted arylthio groups having 6 to 30 carbon atoms, such as phenylthio, p-chlorophenylthio, and m-methoxyphenylthio groups), heterocyclic thio groups (preferably, substituted or unsubstituted heterocyclic thio groups having 2 to 30 carbon atoms, such as 2-benzothiazolylthio and 1-phenyltetrazol-5-yl-thio groups), sulfamoyl groups (preferably, substituted or unsubstituted sulfamoyl groups having 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N—(N')-phenylcarbamoyl)sulfamoyl groups), a sulfo group, alkyl- or aryl-sulfinyl groups (preferably, substituted or unsubstituted alkylsulfinyl groups having 1 to 30 carbon atoms and substituted or unsubstituted arylsulfinyl groups having 6 to 30 carbon atoms, such as methylsulfinyl, ethylsulfinyl, phenylsulfinyl, and p-methylphenylsulfinyl groups), alkyl- or aryl-sulfonyl groups (preferably, substituted or unsubstituted alkylsulfonyl groups having 1 to 30 carbon atoms and substituted or unsubstituted arylsulfonyl groups having 6 to 30 carbon atoms, such as methylsulfonyl, ethylsulfonyl, phenylsulfonyl, and p-methylphenylsulfonyl groups), acyl groups (preferably a formyl group, substituted or unsubstituted alkylcarbonyl groups having 2 to 30 carbon atoms, substituted or unsubstituted arylcarbonyl groups having 7 to 30 carbon atoms, and heterocyclic carbonyl groups having a carbonyl group bound to a substituted or unsubstituted carbon group and having 4 to 30 carbon atoms, such as acetyl, pivaloyl, 2-chloroacetyl, stearoyl, benzoyl, p-n-octyloxyphenylcarbonyl, 2-pyridylcarbonyl, and 2-furylcarbonyl groups), aryloxycarbonyl groups (preferably, substituted or unsubstituted aryloxycarbonyl groups having 7 to 30 carbon atoms, such as phenoxycarbonyl, o-chlorophenoxycarbonyl, m-nitrophenoxycarbonyl, and p-t-butylphenoxycarbonyl groups), alkoxycarbonyl groups (preferably, substituted or unsubstituted alkoxycarbonyl groups having 2 to 30 carbon atoms, such as methoxycarbonyl, ethoxycarbonyl, t-butoxycarbonyl, and n-octadecyloxycarbonyl groups), carbamoyl groups (preferably, substituted or unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl groups), aryl or heterocyclic azo groups (preferably, substituted or unsubstituted arylazo groups having 6 to 30 carbon atoms and substituted or unsubstituted heterocyclic azo groups having 3 to 30 carbon atoms, such as phenylazo, p-chlorophenylazo, and 5-ethylthio-1,3,4-thiadiazol-2-ylazo groups), imido groups (preferably, N-succinimido and N-phthalimido), phosphino groups (preferably, substituted or unsubstituted phosphino groups having 2 to 30 carbon atoms, such as dimethylphosphino, diphenylphosphino, and methylphenoxyphosphino groups), phosphinyl groups (preferably, substituted or unsubstituted phosphinyl groups having 2 to 30 carbon atoms, such as phosphinyl, dioctyloxyphosphinyl, and diethoxyphosphinyl groups), phosphinyloxy groups (preferably, substituted or unsubstituted phosphinyloxy groups having 2 to 30 carbon atoms, such as diphenoxyphosphinyloxy and dioctyloxyphosphinyloxy groups), phosphinylamino groups (preferably, substituted or unsubstituted phosphinylamino groups having 2 to 30 carbon atoms, such as dimethoxyphosphinylamino and dimethylaminophosphinylamino groups), and silyl groups (preferably, substituted or unsubstituted silyl groups having 3 to 30 carbon atoms, such as trimethylsilyl, t-butyldimethylsilyl, and phenyldimethylsilyl groups).

These functional groups may be further substituted with at least one of the above groups in place of the hydrogen atom. Examples of such groups substituted with the above groups include alkylcarbonylaminosulfonyl groups, arylcarbonylaminosulfonyl groups, alkylsulfonylaminocarbonyl groups, and arylsulfonylaminocarbonyl groups. Specific examples include a methylsulfonylaminocarbonyl group, a p-methylphenylsulfonylaminocarbonyl group, an acetylaminosulfonyl group, and a benzoylaminosulfonyl group.

Substituent groups in the aryl moiety of the substituted aralkyl group include the substituent groups in the following substituted aryl group.

The aromatic group in the present specification means an aryl group or a substituted aryl group. These aromatic groups may be fused with an aliphatic ring, another aromatic ring or a hetero ring. The number of carbon atoms in the aromatic group is preferably 6 to 40, more preferably 6 to 30, and still more preferably 6 to 20. Among them, the aryl group is preferably a phenyl or naphthyl group, and particularly preferably a phenyl group.

The aryl moiety of the substituted aryl group has the same meaning as the aforementioned aryl group. Examples of substituent groups in the substituted aryl group are the same as those mentioned in the "examples of substituent groups in the substituted alkyl group, in the substituted alkenyl group, in the substituted alkynyl group and in the alkyl moiety of the substituted aralkyl group".

This luminescent agent is preferably a compound (particularly an organic compound) contained in the group of compounds referred to as fluorogenic agents. The luminescent agent is more preferably a compound represented by any one of the following formulae (I-1) to (I-4):

<Compounds Represented by the Formulae (I-1) to (I-4)>

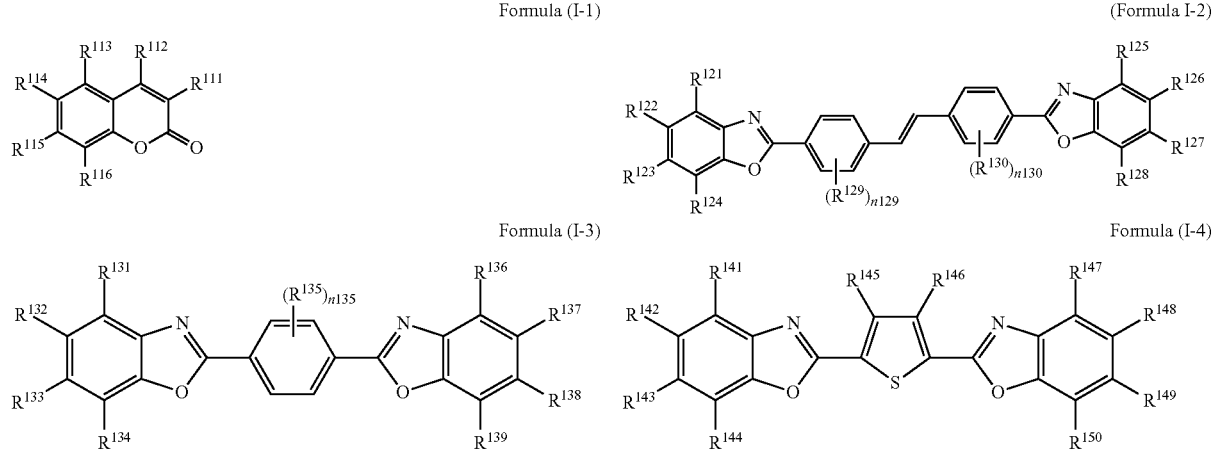

In the present specification, the heterocyclic group preferably contains a 5- or 6-membered saturated or unsaturated heterocycle. An aliphatic ring, an aromatic ring or another heterocycle may be fused with the heterocycle.

Examples of the heteroatom in the heterocycle include B, N, O, S, Se and Te. The heteroatom is preferably N, O or S. Preferably, a carbon atom in the heterocycle has a free atomic valence (monovalent) (heterocyclic group is bound via the carbon atom). The number of carbon atoms in the heterocyclic group is preferably 1 to 40, more preferably 1 to 30, and still more preferably 1 to 20. Examples of the saturated heterocycle include a pyrrolidine ring, a morpholine ring, a 2-bora-1,3-dioxolane ring, and a 1,3-thiazolidine ring. Examples of the unsaturated heterocycle include an imidazole ring, a thiazole ring, a benzothiazole ring, a benzoxazole ring, a benzotriazole ring, a benzoselenazole ring, a pyridine ring, a pyrimidine ring and a quinoline ring. The heterocyclic group may have at least one substituent group. Examples of such a substituent group are the same as those mentioned in the "examples of substituent groups in the substituted alkyl group, in the substituted alkenyl group, in the substituted alkynyl group and in the alkyl moiety of the substituted aralkyl group".

<Near-Infrared-Absorbing Material>

The near-infrared-absorbing material of the invention includes at least one kind of luminescent agent and at least one kind of near-infrared-absorbing compound obtained by oxidizing a compound represented by the formula (II) described later, and if necessary other components such as a binder. Hereinafter, these components are described in detail.

Luminescent Agent

The near-infrared-absorbing material of the invention contains at least one kind of luminescent agent (compound (I-a)). As described above, the luminescent agent in the invention is an inorganic or organic light-emitting compound that absorbs light of certain wavelengths (for example, light of from spectral absorption maximum wavelength to 400 nm) and emits light of longer wavelength (300 to 700 nm) than that of the absorbed light.

In the formula (I-1), $R^{111}$, $R^{112}$, $R^{113}$, $R^{114}$, $R^{115}$ and $R^{116}$ each represent a hydrogen atom or a substituent group. Examples of the substituent group include those mentioned in the "examples of substituent groups in the substituted alkyl group, in the substituted alkenyl group, in the substituted alkynyl group and in the alkyl moiety of the substituted aralkyl group."

$R^{111}$ is preferably a hydrogen atom, a halogen atom, an alkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a hydrogen atom, a halogen atom, an alkyl group, an aryl group, a heterocyclic group, a cyano group, a hydroxyl group, an alkoxy group, an aryloxy group, a silyloxy group, a heterocyclic oxy group, an alkoxycarbonyl group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, an acyl group, an aryloxycarbonyl group, an alkoxycarbonyl group, a carbamoyl group or an imido group, still more preferably a hydrogen atom, an alkyl group, an aryl group, a heterocyclic group, an amino group, an acylamino group, an aminocarbonylamino group, an alkoxycarbonyl group, an alkoxycarbonylamino group, an aryloxycarbonylamino group, a sulfamoylamino group, or an alkyl- or aryl-sulfonylamino group, and even more preferably an alkyl group, an aryl group, a heterocyclic group, an alkoxycarbonyl group, or an acylamino group.

Each of $R^{112}$, $R^{113}$, $R^{114}$ and $R^{116}$ is preferably a hydrogen atom, a halogen atom, an alkyl group, an alkenyl group, an alkynyl group, an aryl group, a heterocyclic group, a cyano group, a hydroxyl group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a hydrogen atom, a halogen atom, an alkyl group, an aryl group, a heterocyclic group, a cyano group, a hydroxyl group, an alkoxy group, an aryloxy group, or a silyl group, still more preferably a hydrogen atom, a halogen atom, or an alkyl group, and most preferably a hydrogen atom.

$R^{115}$ is preferably a hydrogen atom, a halogen atom, an alkyl group, an alkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a hydrogen atom, a halogen atom, an alkyl group, an aryl group, a heterocyclic group, a cyano group, a hydroxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, an alkylthio group, an arylthio group, a heterocyclic thio group, a sulfamoyl group, an acyl group, an aryloxycarbonyl group, an alkoxycarbonyl group, a carbamoyl group, an imido group, or a silyl group, still more preferably a hydrogen atom, an alkyl group, an aryl group, a heterocyclic group, an amino group, an acylamino group, an aminocarbonylamino group, an alkoxycarbonylamino group, an aryloxycarbonylamino group, a sulfamoylamino group, or an alkyl- or aryl-sulfonylamino group, and even more preferably a heterocyclic group, an amino group, or an acylamino group.

In the formula (I-2), $R^{121}$, $R^{122}$, $R^{123}$, $R^{124}$, $R^{125}$, $R^{126}$, $R^{127}$ and $R^{128}$ each independently represent a hydrogen atom or a substituent group. Examples of the substituent group include those mentioned in the "examples of the substituent groups in the substituted alkyl group, in the substituted alkenyl group, in the substituted alkynyl group and in the alkyl moiety of the substituted aralkyl group."

Each of $R^{121}$, $R^{124}$, $R^{125}$ and $R^{128}$ is preferably a hydrogen atom, a halogen atom, an alkyl group, an aryl group, a cyano group, a hydroxyl group, an alkoxy group, an amino group, or a mercapto group, more preferably a hydrogen atom, a halogen atom, an alkyl group, a hydroxyl group, an alkoxy group, or an amino group, and most preferably a hydrogen atom.

Each of $R^{122}$, $R^{123}$, $R^{126}$ and $R^{127}$ is preferably a hydrogen atom, a halogen atom, an alkyl group, an aryl group, a heterocyclic group, a cyano group, a hydroxyl group, a nitro group, a carboxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an imido group, or a silyl group, more preferably a hydrogen atom, a halogen atom, an alkyl group, an aryl group, a hydroxyl group, an alkoxy group, an aryloxy group, an acyloxy group, an amino group, an acylamino group, a mercapto group, an alkylthio group, or a sulfamoyl group, still more preferably a hydrogen atom, an alkyl group, an aryl group, an alkoxy group, an amino group, a mercapto group, or an alkylthio group, and even more preferably a hydrogen atom, an alkyl group, an aryl group, or an alkoxy group.

In the formula (I-2), $R^{129}$ and $R^{130}$ each independently represent a substituent group. Each of $R^{129}$ and $R^{130}$ is preferably a halogen atom, an alkyl group, an aryl group, a cyano group, a hydroxyl group, an alkoxy group, an aryloxy group, a silyloxy group, an amino group, an acylamino group, a mercapto group, an alkylthio group, an arylthio group, a heterocyclic thio group, or a silyl group, more preferably a halogen atom, an alkyl group, an aryl group, an alkoxy group, an aryloxy group, an alkylthio group, an arylthio group, or a heterocyclic thio group, and still more preferably a halogen atom, an alkyl group, an aryl group, or an alkoxy group.

$n_{129}$ and $n_{130}$ each independently represent an integer of 0 to 4. When $n_{129}$ and $n_{130}$ are 2 or more, a plurality of $R^{129}$s and $R^{130}$s may be the same or different.

Each of $n_{129}$ and $n_{130}$ is preferably 0 to 3, more preferably 0 to 2, still more preferably 0 or 1, and most preferably 0.

In the formula (I-3), $R^{131}$, $R^{132}$, $R^{133}$, $R^{134}$, $R^{136}$, $R^{137}$, $R^{138}$ and $R^{139}$ independently represent a hydrogen atom or a substituent group. Examples of the substituent group include those mentioned in the "examples of substituent groups in the substituted alkyl group, in the substituted alkenyl group, in the substituted alkynyl group and in the alkyl moiety of the substituted aralkyl group."

Preferred examples of $R^{131}$, $R^{134}$, $R^{136}$ or $R^{139}$ are the same as those of $R^{121}$. Preferred examples of $R^{132}$, $R^{133}$, $R^{137}$ or $R^{138}$ are the same those of $R^{122}$.

$R^{135}$ represents a substituent group, and examples of the substituent group include those mentioned in the "examples of substituent groups in the substituted alkyl group, in the substituted alkenyl group, in the substituted alkynyl group and in the alkyl moiety of the substituted aralkyl group."

$R^{135}$ is preferably a halogen atom, an alkyl group, an aryl group, a heterocyclic group, a cyano group, a hydroxyl group, an alkoxy group, an aryloxy group, a heterocyclic oxy group, a silyloxy group, an amino group, an acylamino group, a mercapto group, an alkylthio group, an arylthio group, a heterocyclic thio group, or a silyl group, more preferably a halogen atom, an alkyl group, an aryl group, an alkoxy group, an aryloxy group, an amino group, an alkylthio group, or an arylthio group, more preferably a halogen atom, an alkyl group, an alkoxy group, an amino group, or an alkylthio group, and still more preferably a halogen atom or an alkyl group.

$n_{135}$ represents an integer of 0 to 4, and when $n_{135}$ is 2 or more, a plurality of $R^{135}$s may the same or different.

$n_{135}$ is preferably 0 to 3, more preferably 0 to 2, still more preferably 0 or 1, and most preferably 0. It is also preferable that adjacent two $R^{135}$s may be fused with the benzene ring to form a naphtho-1,4-yl group.

In the formula (I-4), $R^{141}$, $R^{142}$, $R^{143}$, $R^{144}$, $R^{145}$, $R^{146}$, $R^{147}$, $R^{148}$, $R^{149}$ and $R^{150}$ each independently represent a hydrogen atom or a substituent group. Examples of the substituent group include those mentioned in the "examples of substituent groups in the substituted alkyl group, in the substituted alkenyl group, in the substituted alkynyl group and in the alkyl moiety of the substituted aralkyl group."

Preferred examples of $R^{141}$, $R^{144}$, $R^{147}$ or $R^{150}$ are the same as those of $R^{121}$. Preferred examples of $R^{142}$, $R^{143}$, $R^{148}$ or $R^{149}$ are the same as those of $R^{122}$.

Each of $R^{145}$ and $R^{146}$ is preferably a hydrogen atom, a halogen atom, an alkyl group, an aryl group, a heterocyclic group, a cyano group, a nitro group, a hydroxyl group, an alkoxy group, an aryloxy group, a heterocyclic oxy group, a silyloxy group, an amino group, an acylamino group, a mercapto group, an alkylthio group, an arylthio group, a heterocyclic thio group, or a silyl group, more preferably a hydrogen atom, a halogen atom, an alkyl group, an aryl group, a heterocyclic group, a cyano group, a nitro group, an alkoxy group, an aryloxy group, a silyloxy group, an amino group, an acylamino group, an alkylthio group, or an arylthio group, still more preferably a hydrogen atom, a halogen atom, an alkyl group, a cyano group, an alkoxy group, or an amino group, and even more preferably a hydrogen atom or an alkyl group.

It is preferable that in the formula (I-1), $R^{111}$ is an alkyl group having 1 to 20 carbon atoms, an aryl group, a nitrogen-containing heterocyclic group, an alkoxycarbonyl group having 1 to 20 carbon atoms or an acylamino group having 1 to 20 carbon atoms, each of $R^{112}$, $R^{113}$, $R^{114}$ and $R^{116}$ is a hydrogen atom, and $R^{115}$ is a heterocyclic group, an amino group or an acylamino group.

It is preferable that in the formula (I-2), each of $R^{121}$, $R^{124}$, $R^{125}$ and $R^{128}$ is a hydrogen atom, each of $R^{122}$, $R^{123}$, $R^{126}$ and $R^{127}$ is a hydrogen atom or an alkyl group having 1 to 20 carbon atoms, and each of $R^{129}$ and $R^{130}$ is a hydrogen atom, that is, $n_{129}=n_{130}=0$.

It is preferable that in the formula (I-3), each of $R^{131}$, $R^{134}$, $R^{136}$ and $R^{139}$ is a hydrogen atom, each of $R^{132}$, $R^{133}$, $R^{137}$ and $R^{138}$ is a hydrogen atom or an alkyl group having 1 to 20 carbon atoms, $R^{135}$ is an alkyl group having 1 to 6 carbon atoms (and is fused with a benzene ring to form a ring), and $n_{135}$ is 0 or 1.

It is preferable that in the formula (I-4), each of $R^{141}$, $R^{144}$, $R^{147}$ and $R^{150}$ is a hydrogen atom, each of $R^{142}$, $R^{143}$, $R^{148}$ and $R^{149}$ is a hydrogen atom or an alkyl group having 1 to 20 carbon atoms, and each of $R^{145}$ and $R^{146}$ is a hydrogen atom.

Among the formulae (I-1), (I-2), (I-3) and (I-4), the formula (I-1), (I-3) and (I-4) are preferable.

Hereinafter, specific examples of compounds (exemplary compounds I-1-1 to I-4-10) represented by any one of the formulae (I-1) to (I-4) are illustrated. However, the invention is not limited by them.

<Examples of Compounds Represented by the Formula (I-1)>

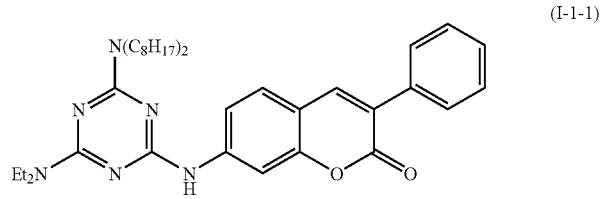
(I-1-1)

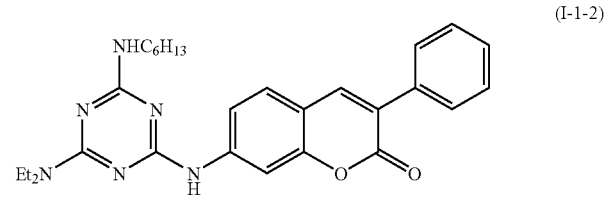
(I-1-2)

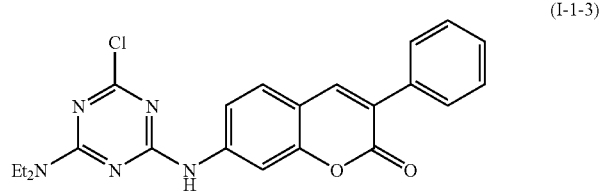
(I-1-3)

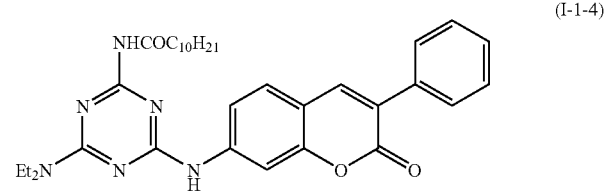
(I-1-4)

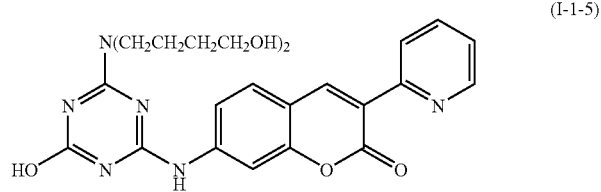
(I-1-5)

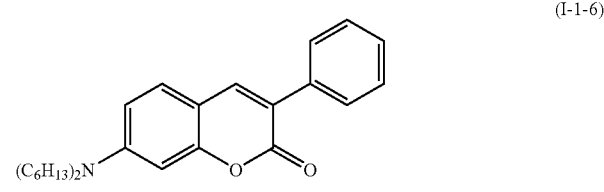
(I-1-6)

-continued
(I-1-7)
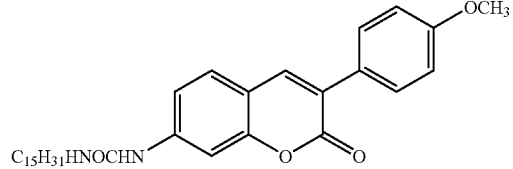
(I-1-8)
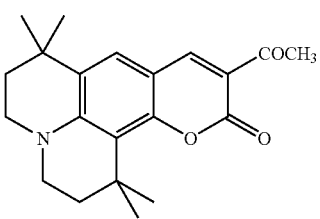
(I-1-9)
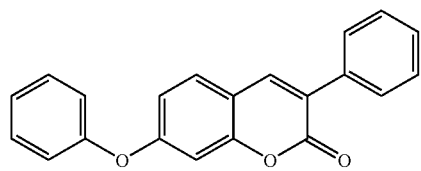
(I-1-10)
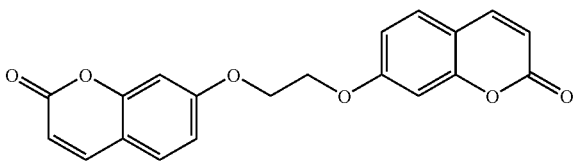
(I-1-11)
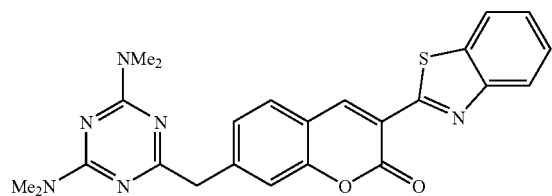
(I-1-12)
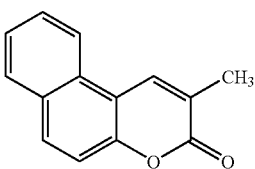
(I-1-13)
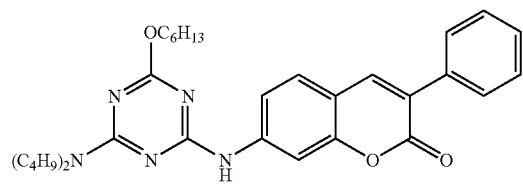
(I-1-14)
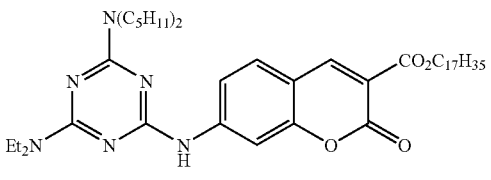
(I-1-15)
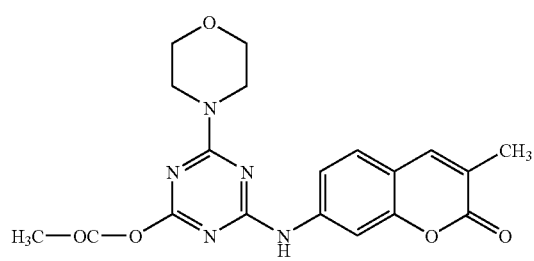
(I-1-16)
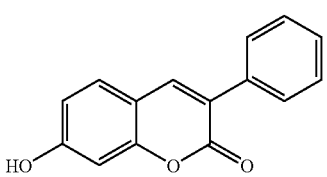
(I-1-17)
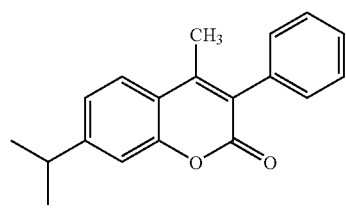
(I-1-18)
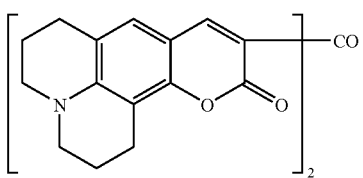
(I-1-19)
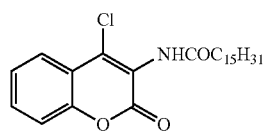
(I-1-20)
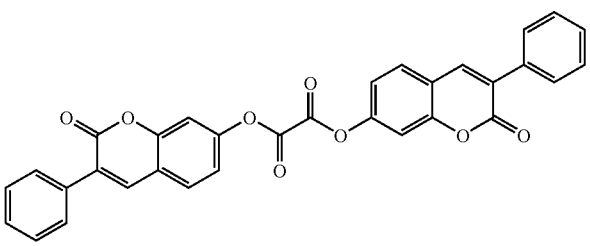

(I-1-21)
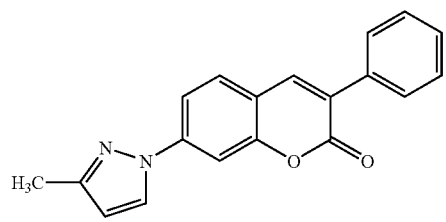
(I-1-22)
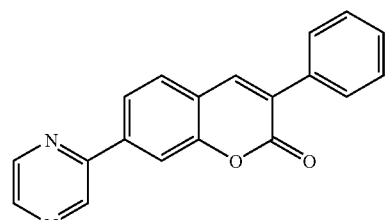
(I-1-23)
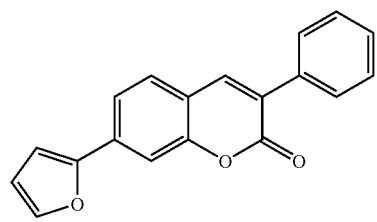
(I-1-24)
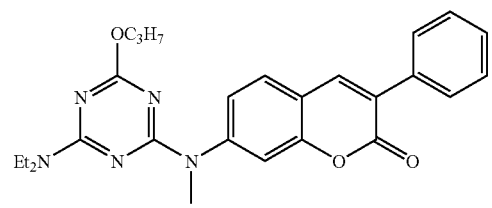
(I-1-25)
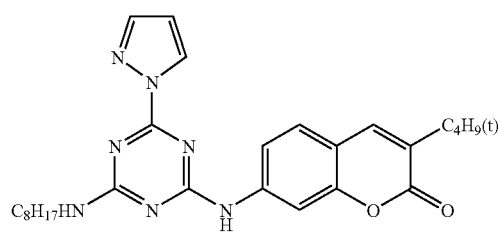
<Examples of Compounds Represented by the Formula (I-2)>
(I-2-1)
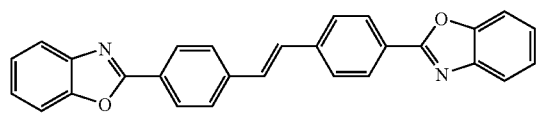
(I-2-2)
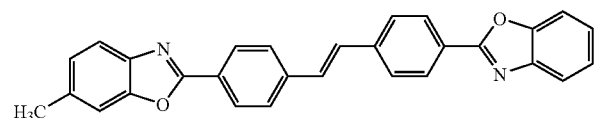
(I-2-3)
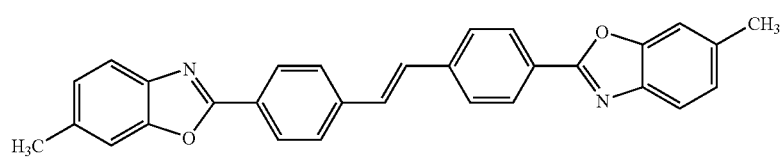
(I-2-4)
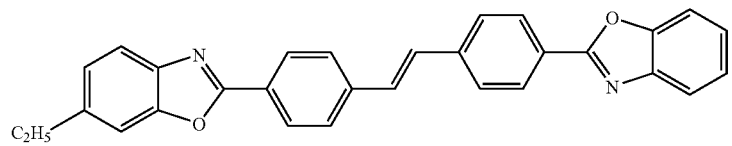
(I-2-5)
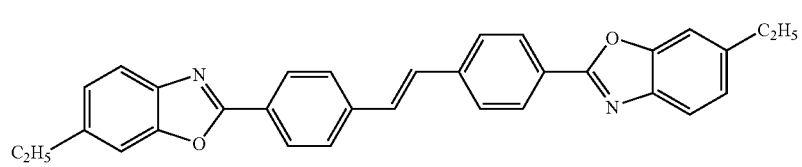
(I-2-6)
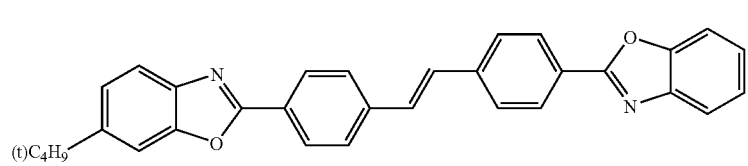

-continued
(I-2-7)
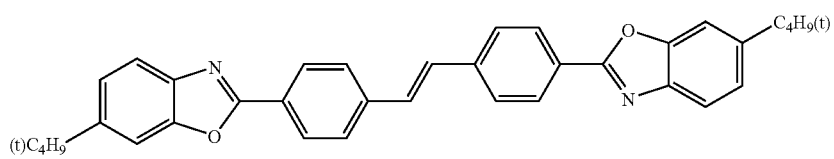
(I-2-8)
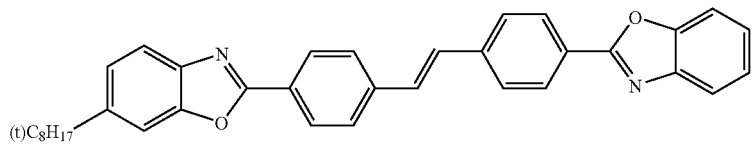
(I-2-9)
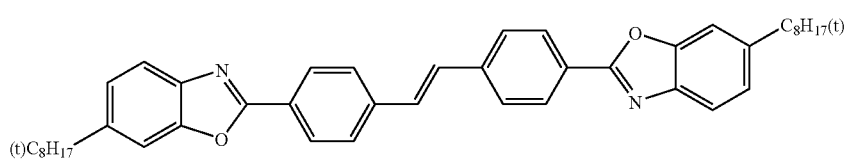
(I-2-10)
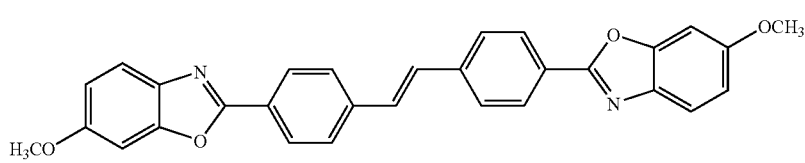
(I-2-11)
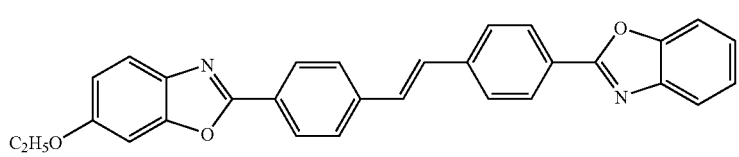
(I-2-12)
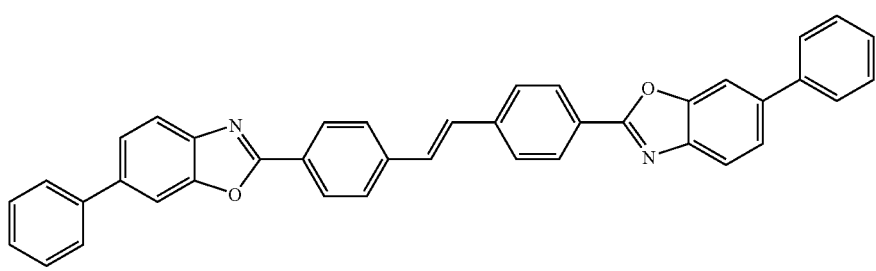
(I-2-13)
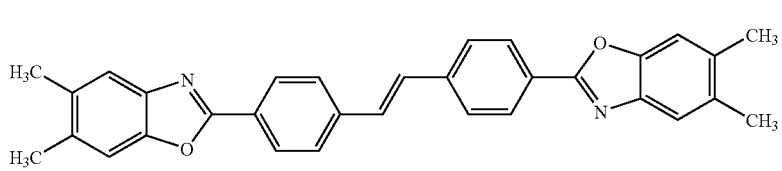
(I-2-14)
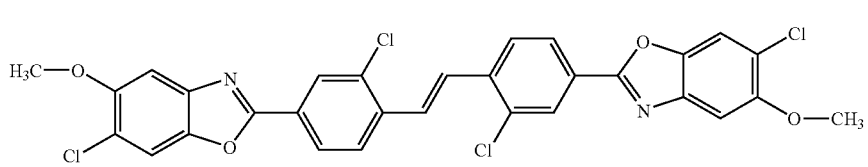

(I-2-15)
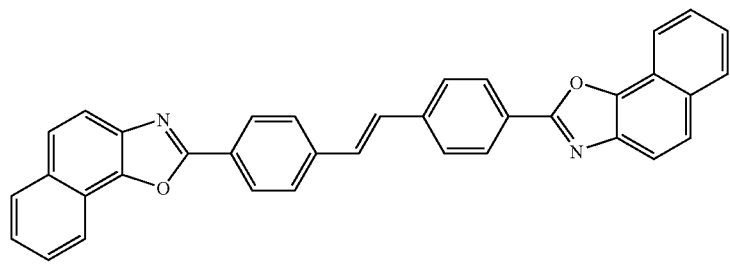
<Examples of Compounds Represented by the Formula (I-3)>
(I-3-1)
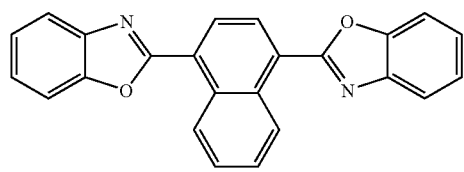
(I-3-2)
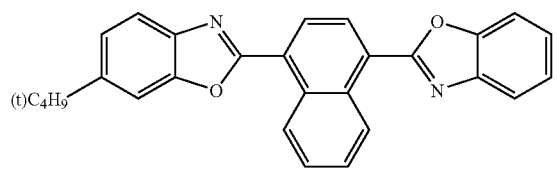
(I-3-3)
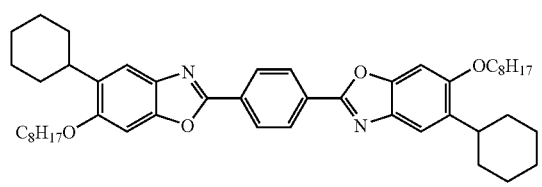
(I-3-4)
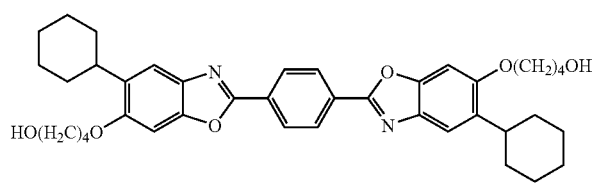
(I-3-5)
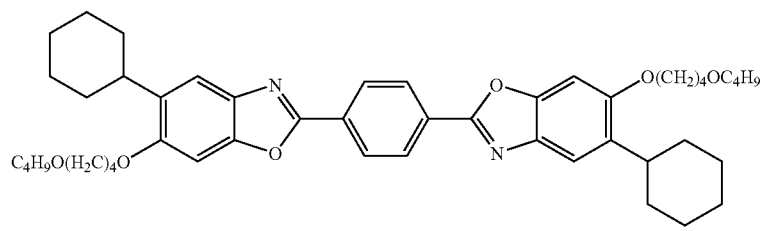
(I-3-6)
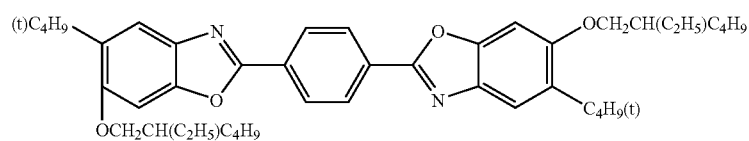
(I-3-7)
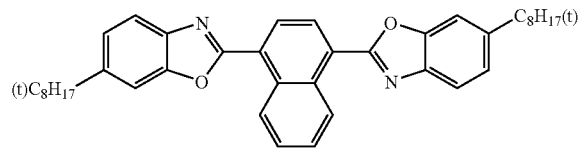
(I-3-8)
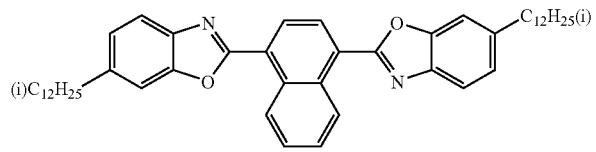
(I-3-9)
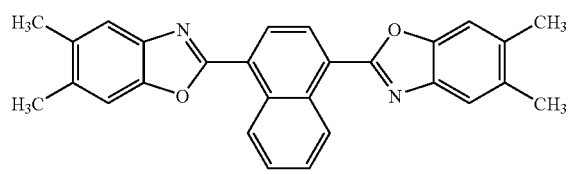
(I-3-10)
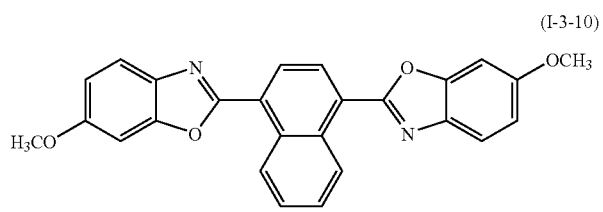

(I-3-11) 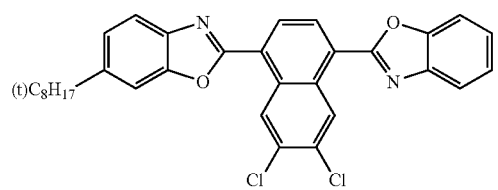

(I-3-12) 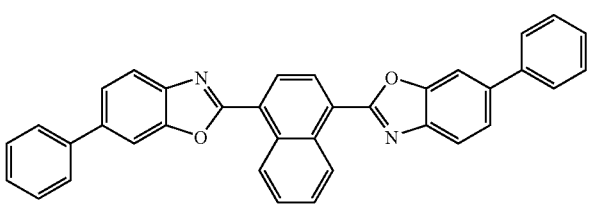

(I-3-13) 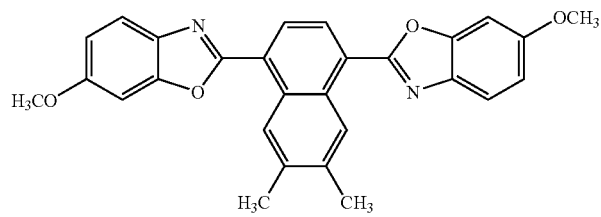

(I-3-14) 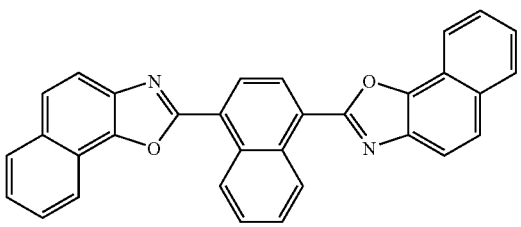

(I-3-15) 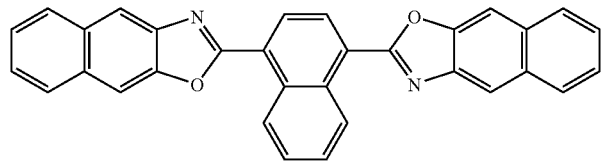

<Examples of Compounds Represented by the Formula (I-4)>

(I-4-1) 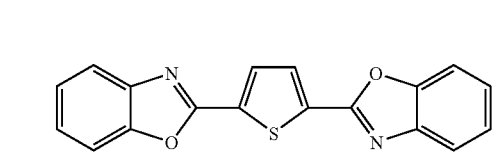

(I-4-7) 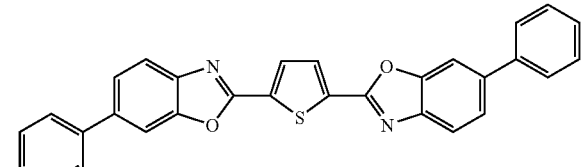

(I-4-2) 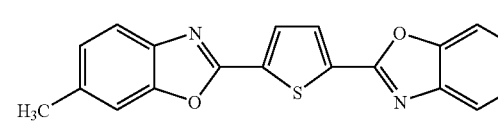

(I-4-3) 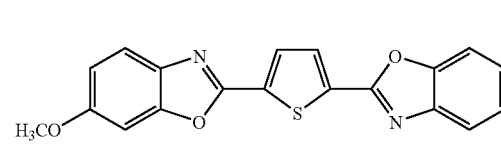

(I-4-8) 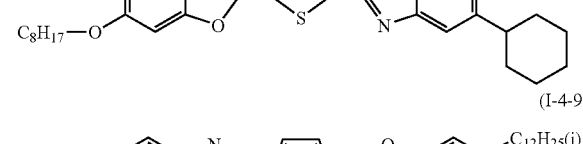

(I-4-4) 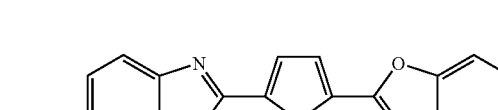

(I-4-9) 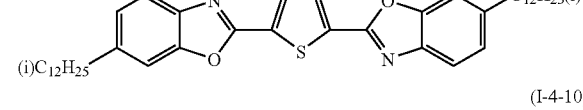

(I-4-5) 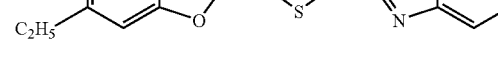

(I-4-10) 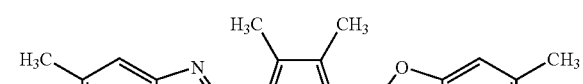

(I-4-6) 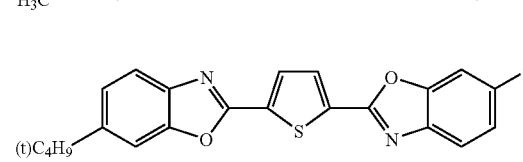

The compound represented by any one of the formulae (I-1) to (I-4) can be synthesized for example by methods described in JP-A No. 2-188573 and EP0684278A1. Alternatively, commercial products can be used as such. Specifically, the compound can be selected from commercial products such as WHITEFULUOR manufactured by Sumitomo Chemical Co., Ltd., HAKKOL manufactured by Showa Chemical Industry Co., Ltd., HOSTALUX manufactured by Hoechst Ltd., and KAYALIGHT manufactured by Nippon Kayaku Co., Ltd.

The content of the luminescent agent(s) (including the compounds represented by the formulae (I-1) to (I-4)) in the near-infrared-absorbing material is preferably $10^{-12}$ to 40% by mass, more preferably $10^{-9}$ to 5% by mass, and still more preferably $10^{-5}$ to 3% by mass, based on the solid content of the near-infrared-absorbing material, while the molar ratio of the near-infrared-absorbing compound to the luminescent agent is in a range described later. When the content of the luminescent agent is in the range mentioned above, the light resistance performance of the near-infrared-absorbing compound can be effectively improved.

Near-Infrared-Absorbing Compound

The near-infrared-absorbing material of the invention contains at least one kind of near-infrared-absorbing compound obtained by oxidizing a compound represented by the formula (II) below. This compound absorbs near-infrared light.

The compound represented by the following formula (II) used in obtaining the near-infrared-absorbing compound in the invention, and its preferable compound that is a compound represented by the formula (XII-1), are described.

<Compound Represented by Formula (II)>

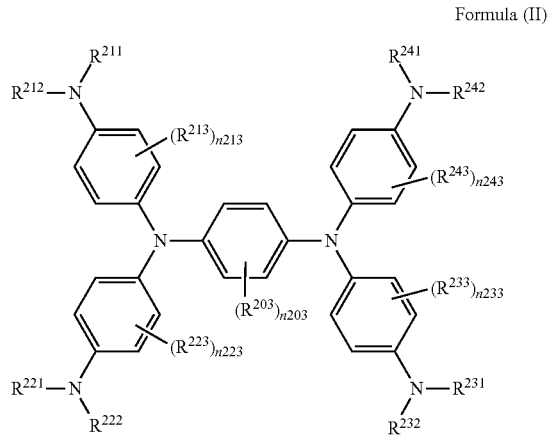

Formula (II)

In the formula (II), $R^{211}$, $R^{212}$, $R^{221}$, $R^{222}$, $R^{231}$, $R^{232}$, $R^{241}$, and $R^{242}$ each independently represent a hydrogen atom, an aliphatic group or an aromatic group. The details of the aliphatic group and aromatic group are the same as in the section "With respect to the groups".

Each of $R^{211}$, $R^{212}$, $R^{221}$, $R^{222}$, $R^{231}$, $R^{232}$, $R^{241}$, and $R^{242}$ is preferably a hydrogen atom, an alkyl group, an alkenyl group, an alkynyl group, or an aryl group, more preferably a hydrogen atom, an alkyl group having 1 to 20 carbon atoms, an alkenyl group having 2 to 20 carbon atoms, an alkynyl group having 2 to 20 carbon atoms or an aryl group having 6 to 20 carbon atoms, still more preferably an alkyl group having 1 to 10 carbon atoms, an alkenyl group having 2 to 10 carbon atoms or an aryl group having 6 to 10 carbon atoms, even more preferably an alkyl group having 1 to 8 carbon atoms or an aryl group having 6 to 8 carbon atoms, and most preferably an alkyl group having 2 to 6 carbon atoms.

All of $R^{211}$, $R^{212}$, $R^{221}$, $R^{222}$, $R^{231}$, $R^{232}$, $R^{241}$, and $R^{142}$ are preferably the same group.

$R^{203}$, $R^{213}$, $R^{223}$, $R^{233}$ and $R^{243}$ each independently represent a substituent group. Examples of the substituent group include those mentioned in the "examples of substituent groups in the substituted alkyl group, in the substituted alkenyl group, in the substituted alkynyl group and in the alkyl moiety of the substituted aralkyl group."

Each of $R^{203}$, $R^{213}$, $R^{223}$, $R^{233}$ and $R^{243}$ is preferably a halogen atom, an alkyl group, an alkenyl group, an alkynyl group, an aryl group, a cyano group, a hydroxyl group, a carboxyl group, an alkoxy group, an aryloxy group, a silyloxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, or a silyl group, more preferably a halogen atom, an alkyl group, an alkenyl group, an aryl group, a cyano group, a hydroxyl group, a carboxyl group, an alkoxy group, an aryloxy group, a silyloxy group, an amino group, an alkylthio group, an arylthio group, an imido group, or a silyl group, still more preferably a halogen atom, an alkyl group, an aryl group, an alkoxy group, an aryloxy group, a silyloxy group, or an amino group, and most preferably an alkyl group.

All of $R^{213}$, $R^{223}$, $R^{233}$ and $R^{243}$ are preferably the same group.

$n_{203}$, $n_{213}$, $n_{223}$, $n_{233}$ and $n_{243}$ each independently represent an integer of 0 to 4. Each of $n_{203}$, $n_{213}$, $n_{223}$, $n_{233}$ and $n_{243}$ is preferably 0 to 3, more preferably 0 to 2, still more preferably 0 or 1, and most preferably 0.

The compound represented by the formula (II) is more preferably a compound wherein:

(1) $R^{211}$, $R^{212}$, $R^{221}$, $R^{222}$, $R^{231}$, $R^{232}$, $R^{241}$ and $R^{242}$ each represent a hydrogen atom, an alkyl group having 1 to 8 carbon atoms or an aryl group having 6 to 8 carbon atoms, $R^{203}$ represents a hydrogen atom (that is, $n_{203}$=0), $R^{213}$, $R^{223}$, $R^{233}$ and $R^{243}$ each represent a hydrogen atom, a halogen atom, a hydroxyl group, an alkyl group (particularly an alkyl group having 1 or 2 carbon atoms), an alkoxy group (particularly an unsubstituted alkoxy group having 1 to 5 carbon atoms), and $n_{213}$, $n_{223}$, $n_{233}$ and $n_{243}$ each represent 0 or 1, or (2) $R^{211}$, $R^{212}$, $R^{221}$, $R^{222}$, $R^{231}$, $R^{232}$, $R^{241}$ and $R^{242}$ each represent the same group that is a hydrogen atom, an alkyl group having 1 to 8 carbon atoms or an aryl group having 6 to 8 carbon atoms, and $R^{203}$, $R^{213}$, $R^{223}$, $R^{233}$ and $R^{243}$ each represent a hydrogen atom, that is, $n_{203}$, $n_{213}$, $n_{223}$, $n_{233}$ and $n_{243}$ each represent 0.

<Compound Represented by the Formula (XII-1)>

To achieve more excellent light resistance, the near-infrared-absorbing compound obtained by oxidizing the compound represented by the formula (II) is preferably a diimonium salt compound represented by formula (XII-1) below. The diimonium salt compound is a compound showing strong absorption in the near-infrared region of 800 nm or more and has, as a fundamental skeleton, a para-phenylenediamine having high visible-light transmittance.

Formula (XII-1)

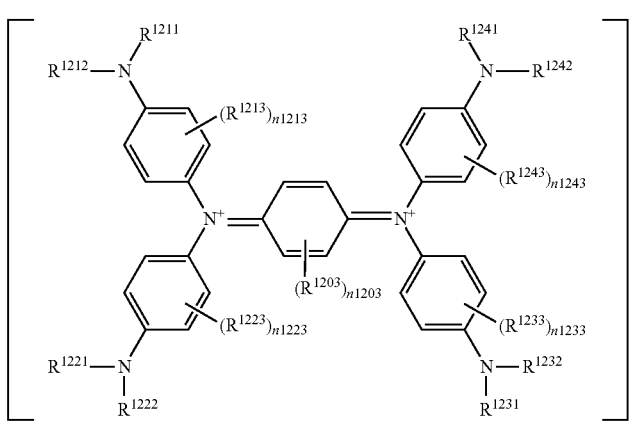

·n_{1253}(X)

In the formula (XII-1), $R^{1211}$, $R^{1212}$, $R^{1221}$, $R^{1222}$, $R^{1231}$, $R^{1232}$, $R^{1241}$, and $R^{1242}$ each independently represent a hydrogen atom, an aliphatic group or an aromatic group. The details of the aliphatic group and aromatic group are the same as in the section "With respect to the groups".

$R^{1211}$, $R^{1212}$, $R^{1221}$, $R^{1222}$, $R^{1231}$, $R^{1232}$, $R^{1241}$, or $R^{1242}$ have the same meaning as $R^{211}$, and their preferable examples are also the same as those defined therein. It is also preferable that all of $R^{1211}$, $R^{1212}$, $R^{1221}$, $R^{1222}$, $R^{1231}$, $R^{1232}$, $R^{1241}$, and $R^{1242}$ are the same group.

$R^{1203}$, $R^{1213}$, $R^{1223}$, $R^{1233}$, and $R^{1243}$ each independently represent a substituent group. Examples of the substituent group include those shown in the "examples of substituent groups in the substituted alkyl group, in the substituted alkenyl group, in the substituted alkynyl group and in the alkyl moiety of the substituted aralkyl group."

$R^{1203}$, $R^{1213}$, $R^{1223}$, $R^{1233}$ and $R^{1243}$ have the same meaning as $R^{203}$, and their preferable examples are also the same as those defined therein. It is also preferable that all of $R^{1213}$, $R^{1223}$, $R^{1233}$ and $R^{1243}$ are the same group.

$n_{1203}$, $n_{1213}$, $n_{1223}$, $n_{1233}$ and $n_{1243}$ each independently represent an integer of 0 to 4. $n_{1203}$, $n_{1213}$, $n_{1223}$, $n_{1233}$ and $n_{1243}$ have the same meaning as $n_{203}$, and their preferable examples are also the same as those defined therein.

X represents a monovalent or divalent anion, and X is preferably a perchlorate ion, a carboxylate ion, a sulfonate ion, a hexafluorophosphate ion, a tetrafluoroborate ion, or a hexafluoroantimonate ion, more preferably a perchlorate ion, a sulfonate ion, a hexafluorophosphate ion, a tetrafluoroborate ion, or a hexafluoroantimonate ion, still more preferably a sulfonate ion, a hexafluorophosphate ion, a tetrafluoroborate ion, or a hexafluoroantimonate ion, even more preferably a hexafluorophosphate ion, a tetrafluoroborate ion, or a hexafluoroantimonate ion.

$n_{1253}$ represents 1 or 2, and preferably, $n_{1253}$ is 2, and the product of $n_{1253}$ multiplied by the valence of X is 2.

The compound represented by the formula (XII-1) is more preferably a compound wherein:
(1) $R^{1211}$, $R^{1212}$, $R^{1221}$, $R^{1222}$, $R^{1231}$, $R^{1232}$, $R^{1241}$ and $R^{1242}$ each represent an alkyl group having 1 to 8 carbon atoms or an aryl group having 6 to 8 carbon atoms, $R^{1203}$ represents a hydrogen atom (that is, $n_{1203}$=0), $R^{1213}$, $R^{1223}$, $R^{1233}$ and $R^{1243}$ each represent an alkyl group having 1 or 2 carbon atoms, each of $n_{1213}$, $n_{1223}$, $n_{1233}$ and $n_{1243}$ is 0 or 1, X is a hexafluorophosphate ion, a tetrafluoroborate ion or a hexafluoroantimonate ion, and $n_{1253}$ is 2, or
(2) $R^{1212}$, $R^{1221}$, $R^{1222}$, $R^{1231}$, $R^{1232}$, $R^{1241}$ and $R^{1242}$ each represent the same group that is an alkyl group having 1 to 8 carbon atoms or an aryl group having 6 to 8 carbon atoms, and $R^{1203}$, $R^{1213}$, $R^{1223}$, and $R^{1243}$ each represent a hydrogen atom, that is, $n_{1203}$, $n_{1213}$, $n_{1223}$, $n_{1233}$ and $n_{1243}$ each represent 0, X is a hexafluorophosphate ion, a tetrafluoroborate ion or a hexafluoroantimonate ion, and $n_{1253}$ is 2.

Hereinafter, specific examples of compounds (exemplary compounds II-1 to II-30, exemplary compounds XII-1 to XII-30) represented by the formula (II) or the formula (XII-1) are illustrated. However, the invention is not limited by them.

<Examples of Compounds Represented by Formula (II)>

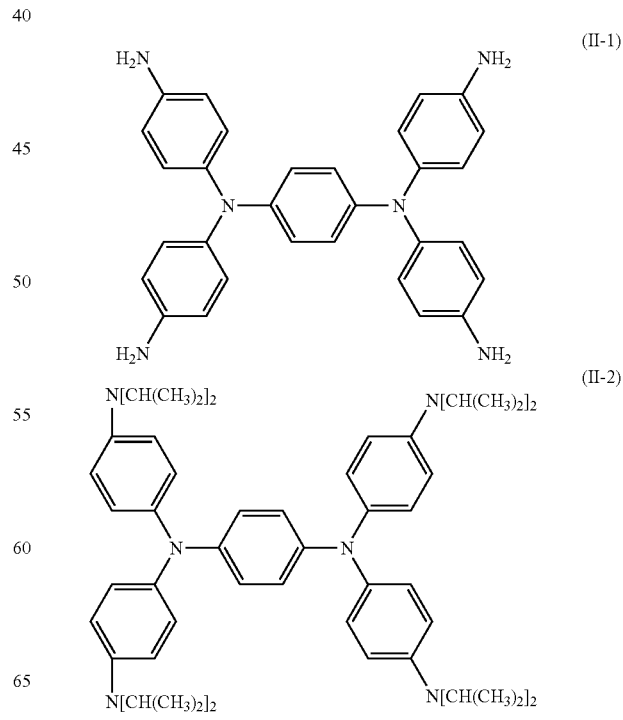

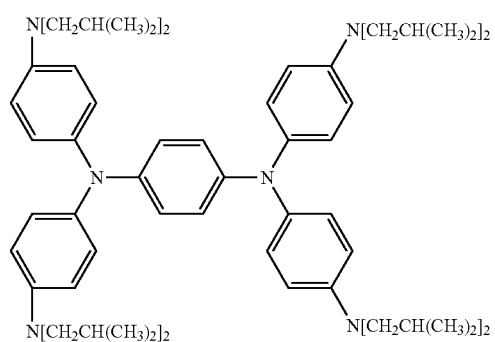
(II-3)
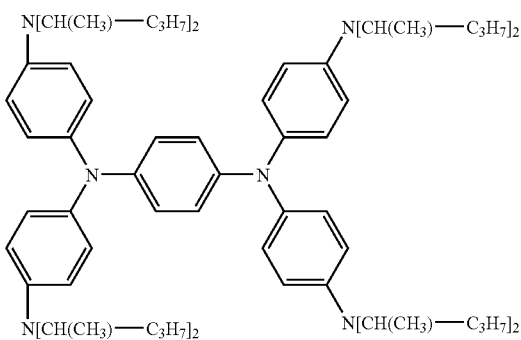
(II-7)
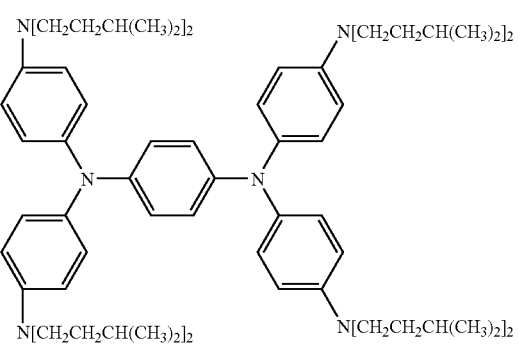
(II-4)
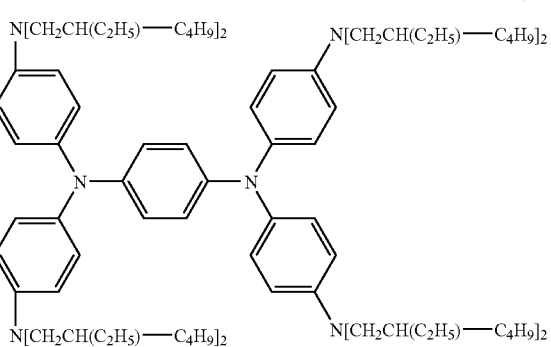
(II-8)
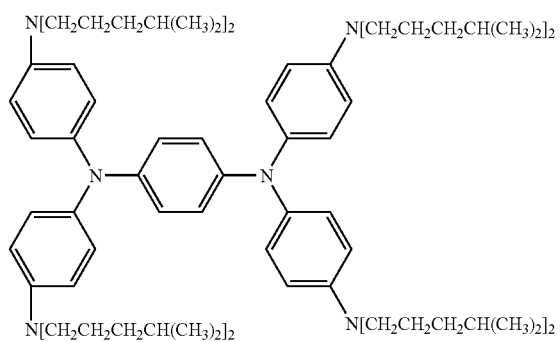
(II-5)
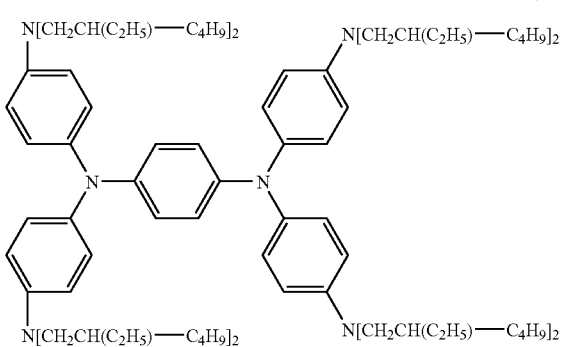
(II-9)
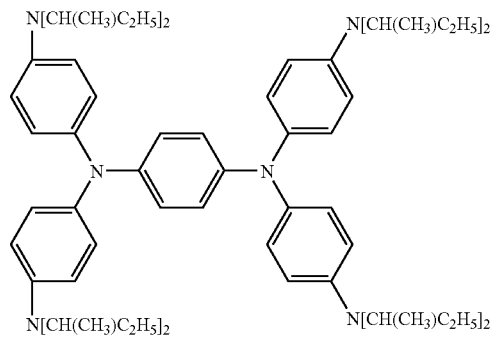
(II-6)
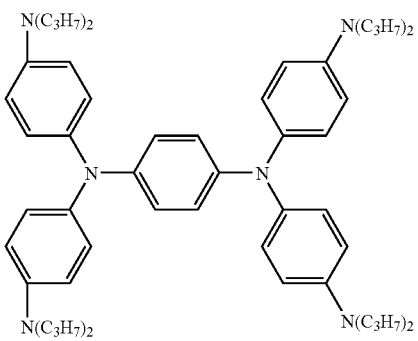
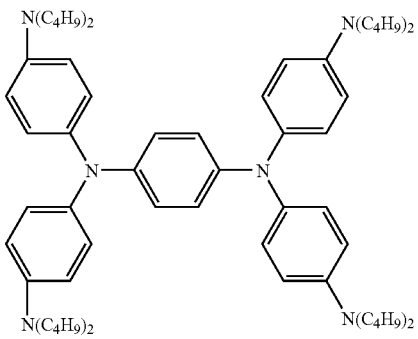
(II-10)

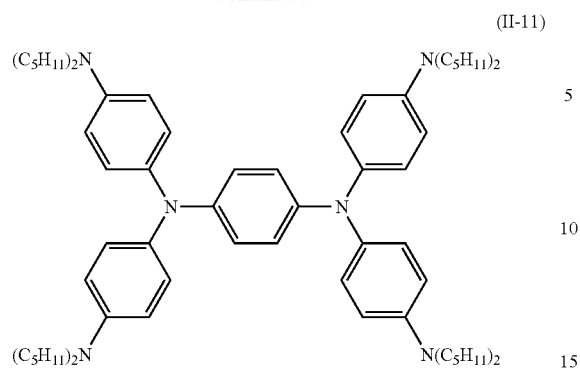
(II-11)
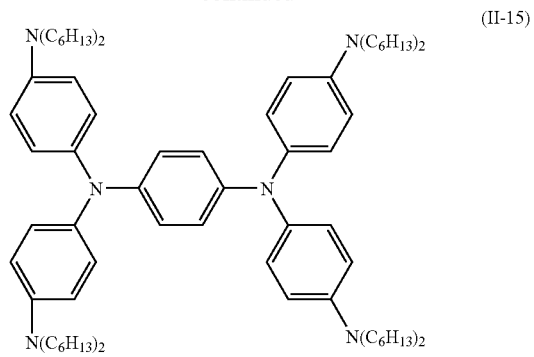
(II-15)
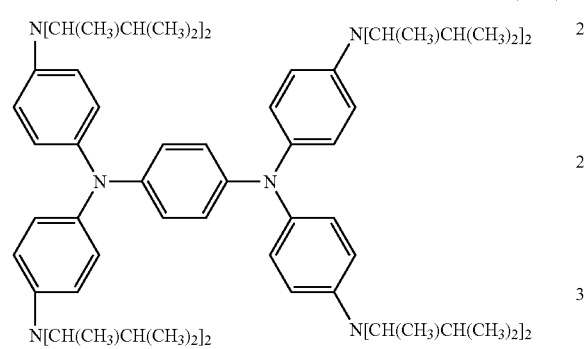
(II-12)
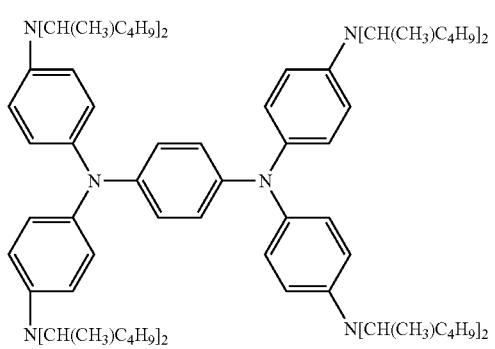
(II-16)
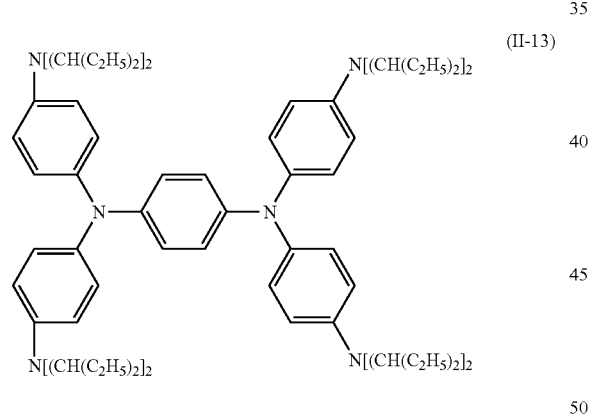
(II-13)
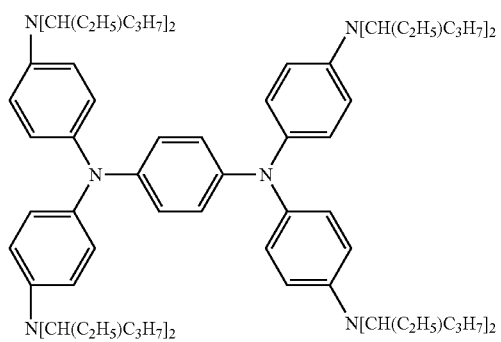
(II-17)
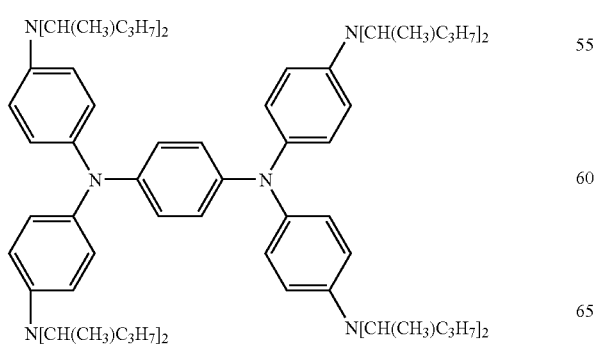
(II-14)
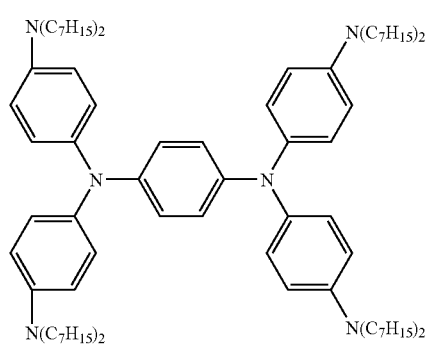
(II-18)

-continued
(II-19)
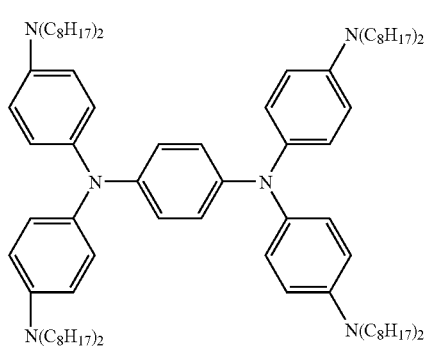
(II-23)
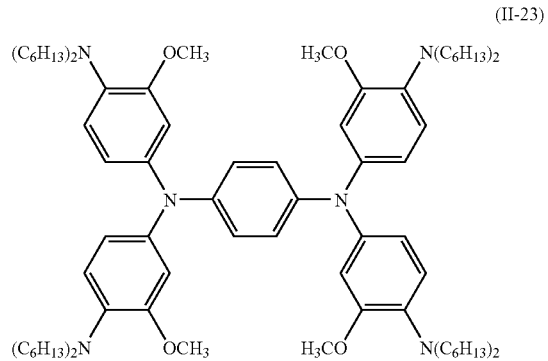
(II-20)
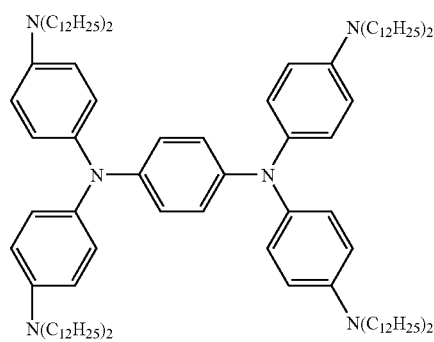
(II-24)
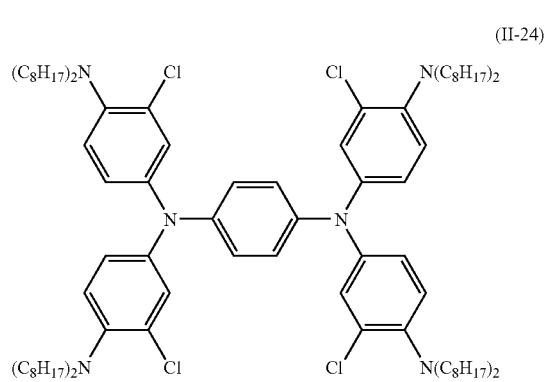
(II-21)
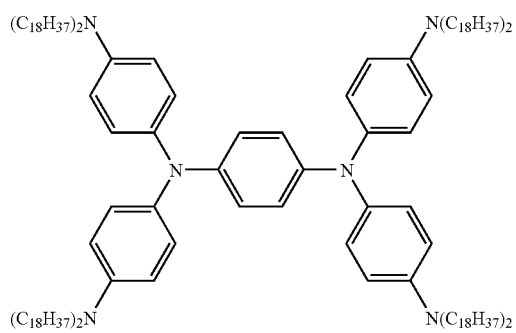
(II-25)
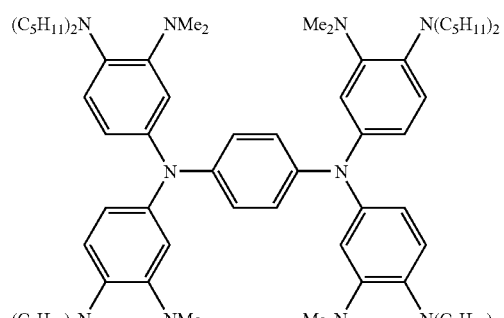
(II-22)
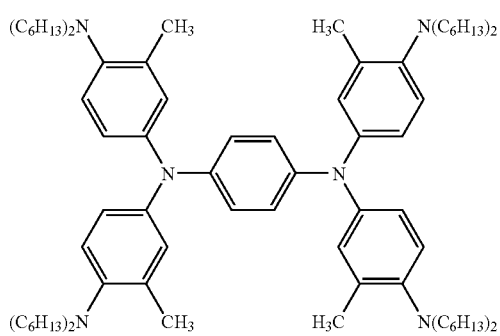
(II-26)
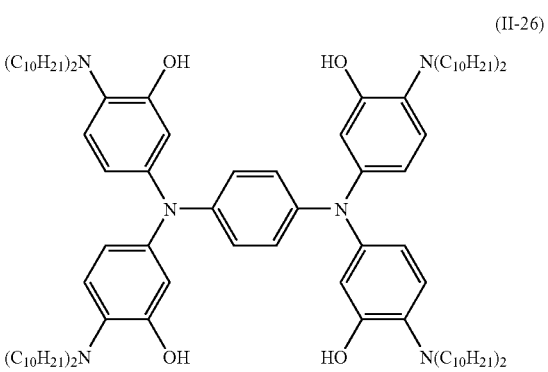

(II-27)
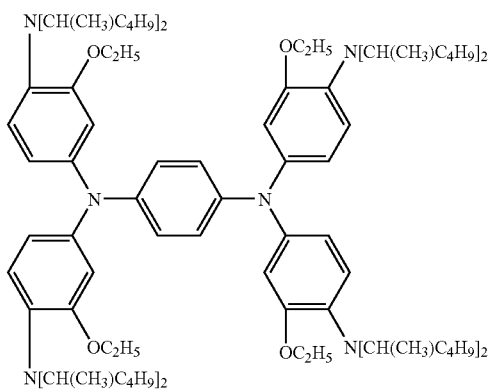
(II-28)
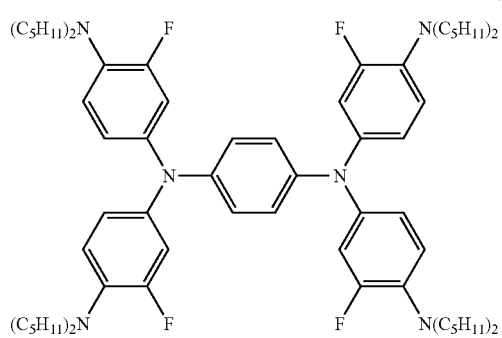
(II-29)
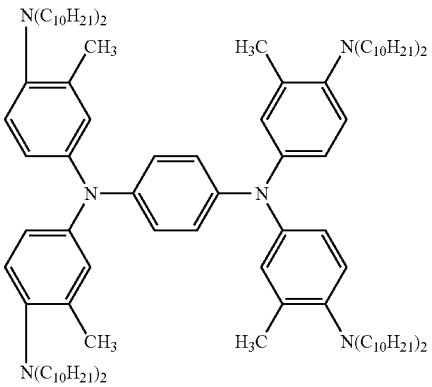
(II-30)
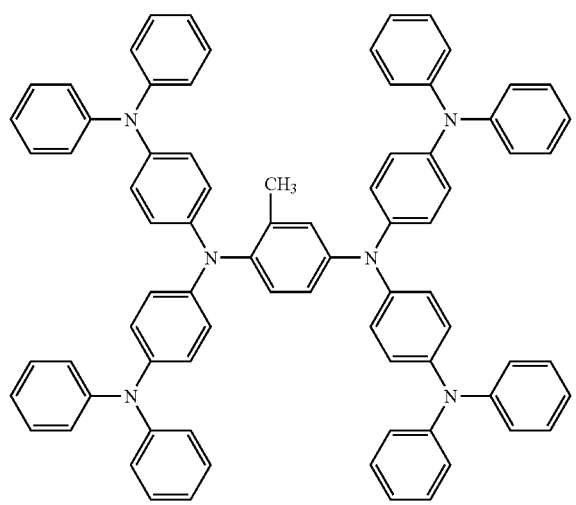
<Examples of Compounds Represented by Formula (XII-1)>
(XII-1)
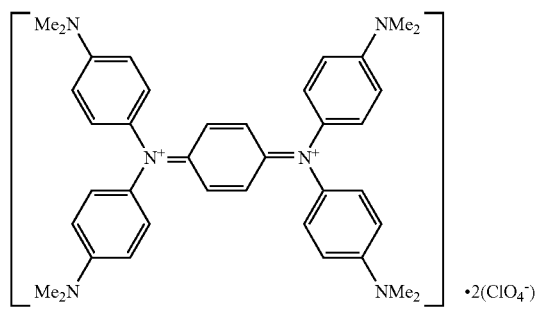
(XII-2)
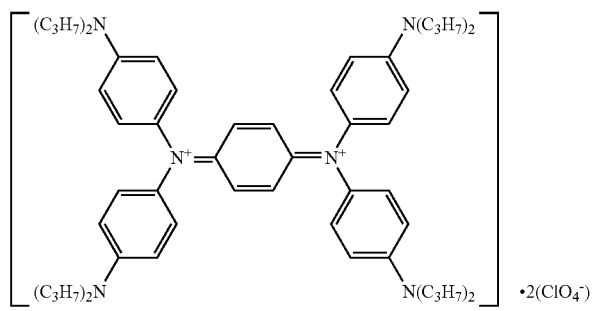
(XII-3)
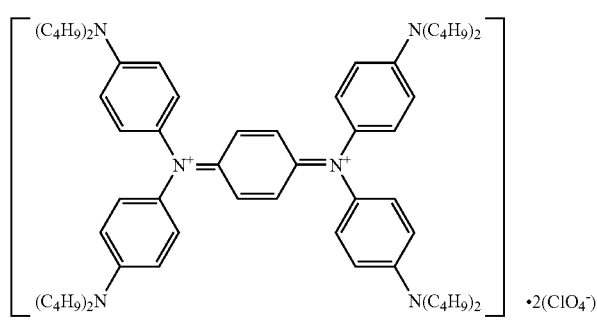
(XII-4)
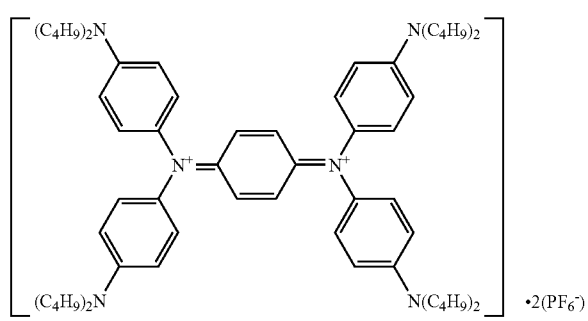

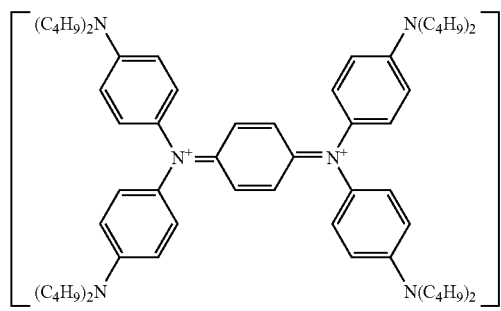
(XII-5)
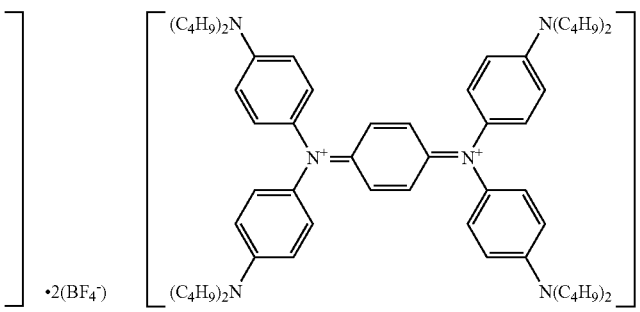
(XII-6)
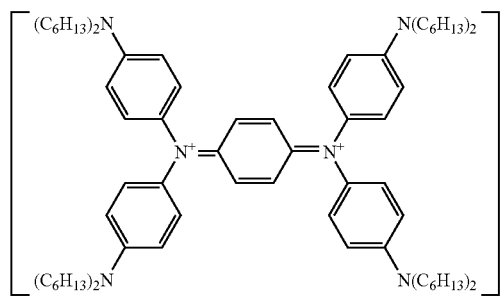
(XII-7)
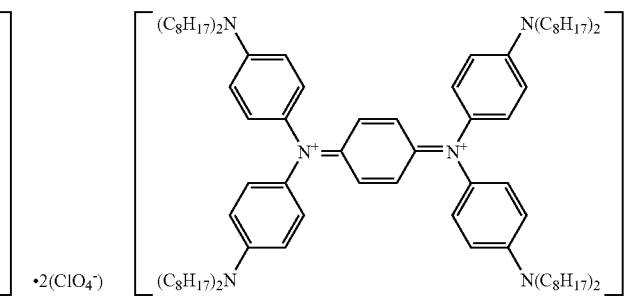
(XII-8)
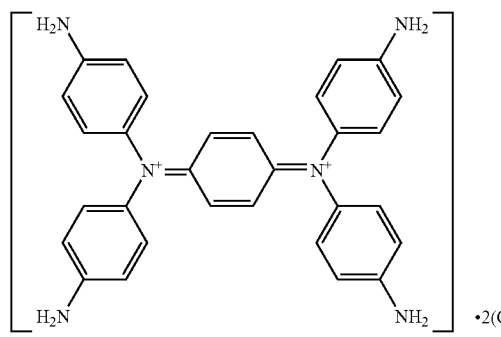
(XII-9)
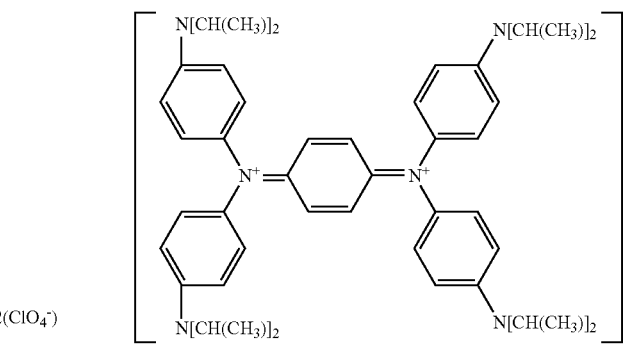
(XII-10)
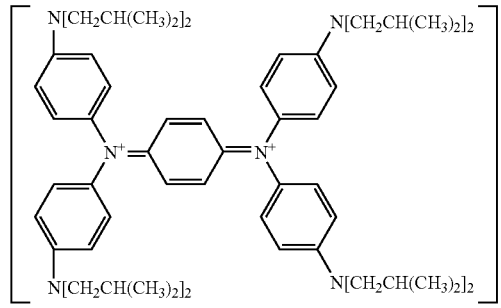
(XII-11)
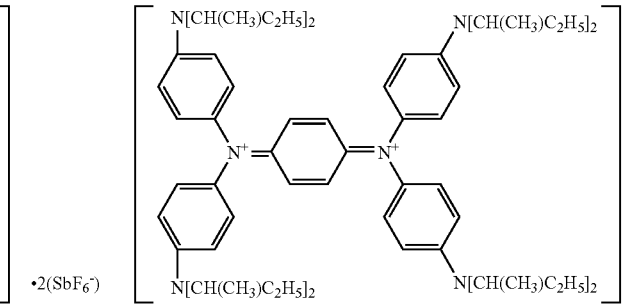
(XII-12)
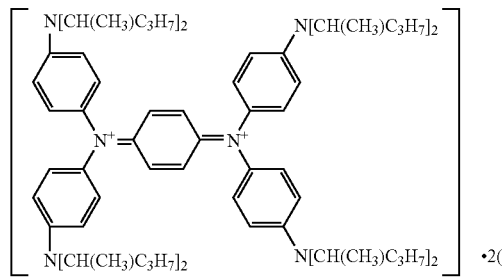
(XII-13)
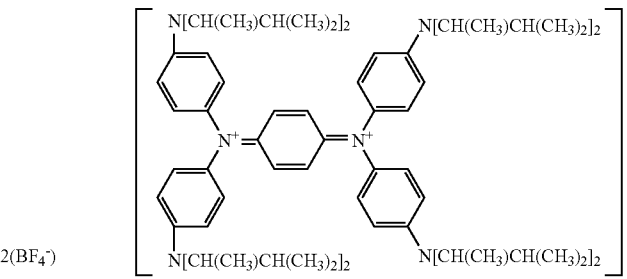
(XII-14)

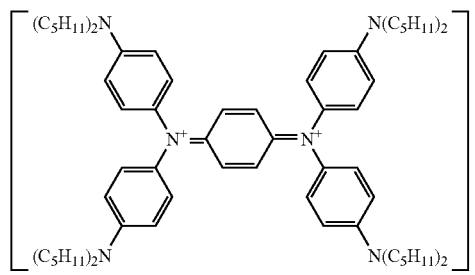
(XII-15)
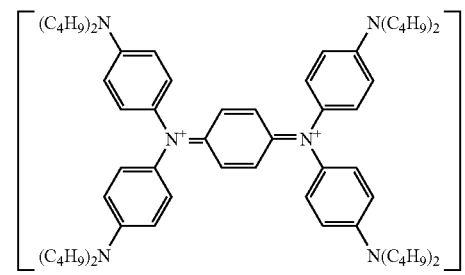
(XII-16)
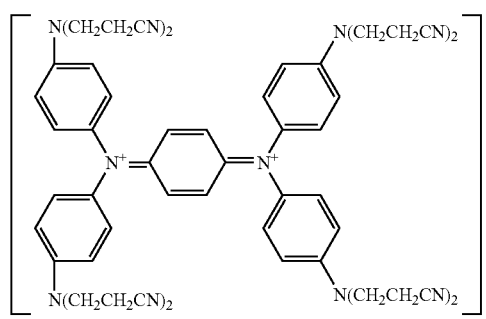
(XII-17)
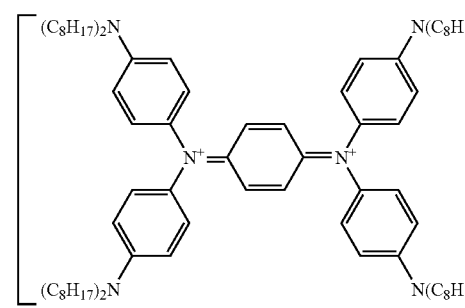
(XII-18)
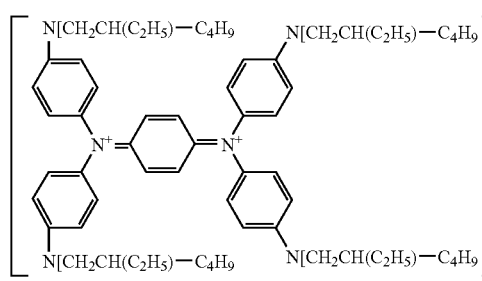
(XII-19)
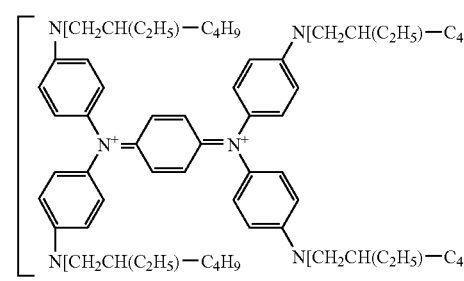
(XII-20)
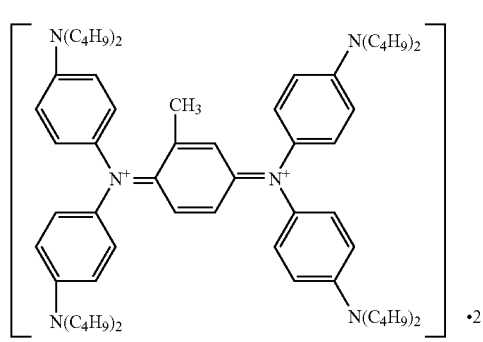
(XII-21)
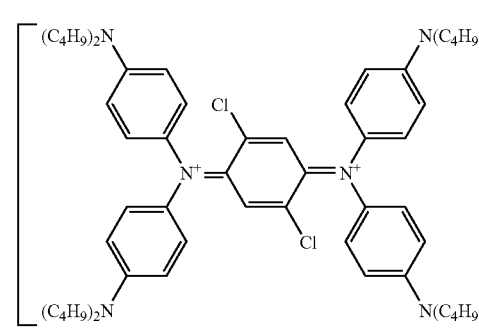
(XII-22)
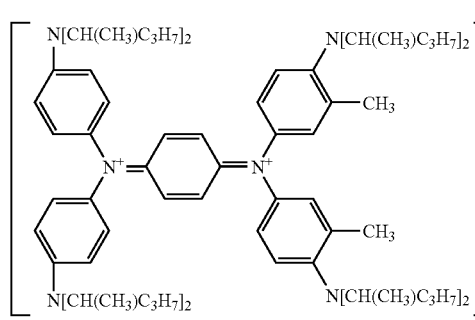
(XII-23)
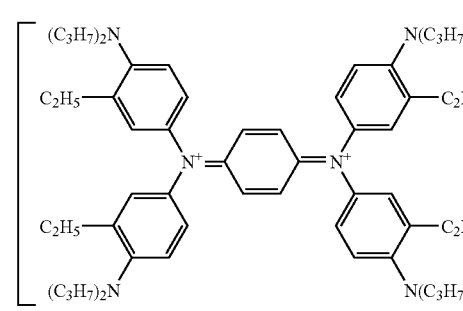
(XII-24)

(XII-25)
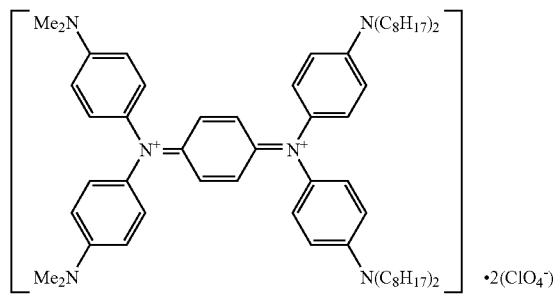
•2(ClO₄⁻)
(XII-26)
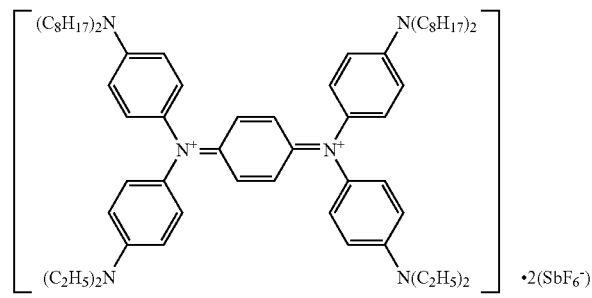
•2(SbF₆⁻)
(XII-27)
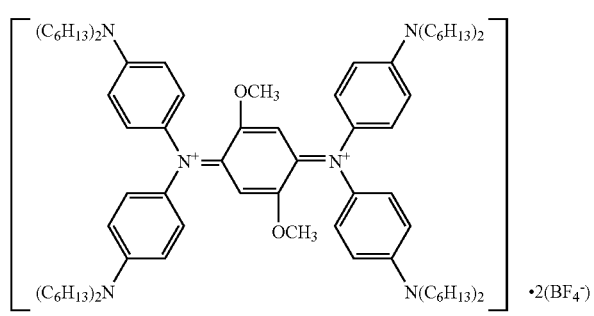
•2(BF₄⁻)
(XII-28)
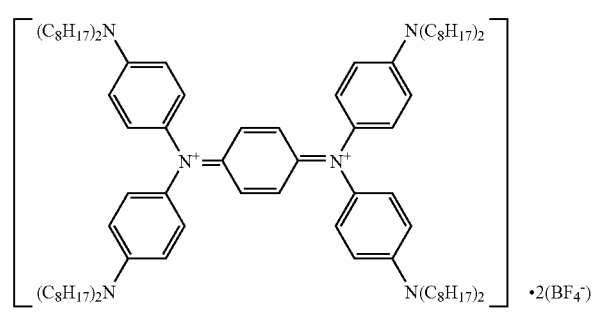
•2(BF₄⁻)
(XII-29)
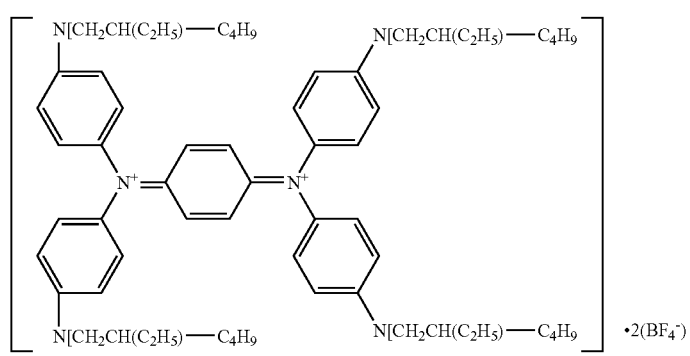
•2(BF₄⁻)
(XII-30)
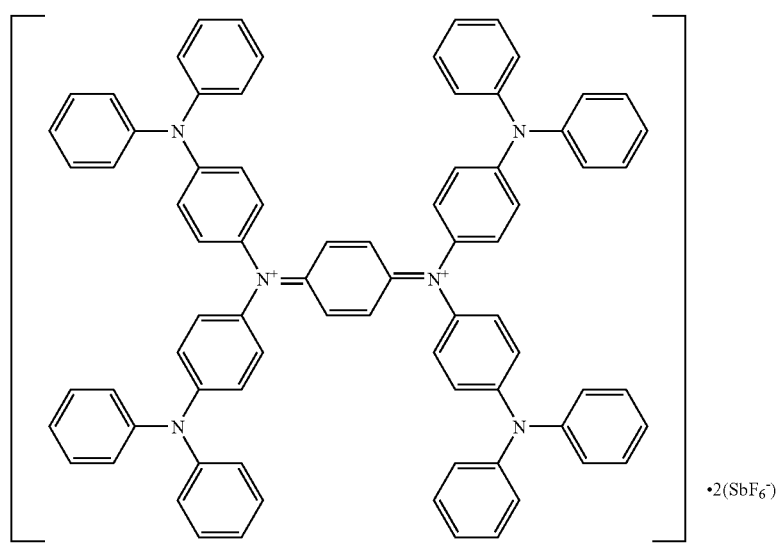
•2(SbF₆⁻)

The near-infrared-absorbing compound in the invention is obtained by oxidizing the compound represented by the formula (II). By oxidizing the compound represented by the formula (II), an aminium dye or the diimonium dye represented by the formula (XII-1) can be obtained.

For production of these compounds, reference can be made to a method of oxidizing the compound of the formula (II) with $Cu^{2+}$ (see Japanese Patent Application Publication (JP-B) No. 59-40825 and JP-A No. 63-51462), a method of oxidizing the compound of the formula (II) with $Fe^{3+}$ (see JP-A No. 2-311447 and JP-A No. 11-315054), a method utilizing an oxidation reaction with a solid catalyst (see JP-A No. 5-98243), a method of oxidation with peroxodisulfate (see JP-A No. 2003-55643), and a method of oxidation with silver hexafluoroantimonate and electrical oxidation described in Journal of Dispersion Science and Technology, Vol. 23, p. 555 (2002) (see JP-A No. 61-246391).

The content of the near-infrared-absorbing compound (including the compound represented by the formula XII-1) in the near-infrared-absorbing material is preferably $10^{-20}$ to 20% by mass, more preferably $10^{-7}$ to 5% by mass, still more preferably $10^{-4}$ to 3% by mass, based on the solid content of the near-infrared-absorbing material, while the molar ratio of the near-infrared-absorbing compound to the luminescent agent is within the range described later. When the content of the near-infrared-absorbing compound is in the range mentioned above, the efficiency of absorption of near-infrared light can be secured.

The ratio (molar ratio) of the number of moles of the luminescent agent (compound (I-a)) to the number of moles of the near-infrared-absorbing compound (compound (XII-a)) in the infrared absorbing material of the invention, that is, the molar ratio of the compound (I-a) to the compound (XII-a), is preferably 0.05 or more. When the molar ratio is 0.05 or more, the abundance of the luminescent agent can be secured to improve light resistance more effectively. The molar ratio is preferably 0.05 to 2, more preferably 0.1 to 1.5, and still more preferably 0.1 to 1.0.

Other Components

The near-infrared-absorbing material of the invention can make use of other components such as a resin and a monomer besides the aforementioned components.

Examples of the resin (binder) include ABS resin, polyethylene resin, polypropylene resin, polyvinyl chloride resin, polycarbonate resin, polystyrene resin, polyacrylonitrile resin, methacrylonitrile resin, methacrylonitrile resin, polymethacrylate resin, and polyester resin.

The luminescent agent (hereinafter referred to as compound (I-a)) and the near-infrared-absorbing compound (compound (XII-a)) can be used as it is or in the form of a solution or used in combination with other compounds such as a resin (binder) or a monomer, or kneaded, or applied (for example by coating) onto paper, a resin sheet, a resin, a film, glass, or a metal plate, or used as a hard coat, or polymerized, so that the near-infrared-absorbing material of the invention can be used for various applications.

The near-infrared-absorbing material of the invention can be prepared for example by the following methods:
(1) a method that involves dissolving or dispersing the luminescent agent (compound (I-a)) and the near-infrared-absorbing compound (compound (XII-a)) in a solvent (for example, chloroform, methylene chloride, toluene, acetone, methyl ethyl ketone, cyclohexanone, ethyl acetate, dibutyl ether, tetrahydrofuran or dimethylformamide);
(2) a method that involves heating and kneading the luminescent agent (compound (I-a)) and the near-infrared-absorbing compound (compound (XII-a)) with a resin (for example, ABS resin, polyethylene resin, polypropylene resin, polyvinyl chloride resin, polycarbonate resin, polystyrene resin, polyacrylonitrile resin, methacrylonitrile resin, polymethacrylate resin or polyester resin);
(3) a method that involves dissolving or dispersing the luminescent agent (compound (I-a)) and the near-infrared-absorbing compound (compound (XII-a)) in the above solvent, adding the above resin to the solution or dispersion, and dissolving the resin therein by heating, and optionally forming it into a thin film, followed by solidification thereof; and
(4) a method that involves dissolving or dispersing the luminescent agent (compound (I-a)) and the near-infrared-absorbing compound (compound (XII-a)) in the above solvent and then applying the resulting solution or dispersion onto a substrate or a film of the above resin.

The near-infrared-absorbing material of the invention can be used preferably in various applications such as an optical recording medium for long-wavelength laser, a recording material for invisible printing, an optical filter, a filter for building or agriculture, and a coating material. Among these applications, the near-infrared-absorbing material can be applied preferably to a recording medium for invisible printing, an optical filter, a filter for building or agriculture, and a coating material, more preferably to a recording material for invisible printing and an optical filter.

The near-infrared-absorbing material of the invention can satisfy both light resistance and invisibility as described above, and can thus be expected for use in new applications.

<Near-Infrared-Absorbing Filter>

The near-infrared-absorbing filter of the invention is prepared by using the near-infrared-absorbing material of the invention described above. The near-infrared-absorbing filter of the invention is composed of the near-infrared-absorbing material of the invention and thus hardly shows less absorption deterioration under exposure to infrared light, can maintain an effect of absorbing near-infrared light for a prolonged period of time, and can be used stably.

The near-infrared-absorbing filter of the invention can be prepared for example by heating and melting the near-infrared-absorbing material of the invention, then optionally forming it into a thin film, and solidifying it, or by applying the near-infrared-absorbing material of the invention onto a substrate or a resin film for example by coating.

The substrate can be selected from known transparent to opaque substrates. For the resin used as a resin film, the resin described in the method (2) can be used.

When the near-infrared-absorbing material of the invention is used in the form of a film, the thickness of the film is preferably 0.1 to 1000 μm, and more preferably 0.5 to 50 μm, from the viewpoint of near-infrared-ray absorptive power, physical strength, and bending strength.

EXAMPLES

Hereinafter, the invention is described in more detail by reference to the Examples, but the invention is not limited to the following examples and may be modified without departure from the gist of the invention.

Example 1

Preparation of Near-Infrared-Absorbing Filter

Hundred ml of chloroform was added to 10 g of polystyrene, a luminescent agent (compound (I-a)) in the amounts shown in Table 1 or 2, and 0.1 g of near-infrared-absorbing compound (compound (XII-6)), the resultant was stirred at 40° C. for 15 minutes to dissolve the components in the solvent, and the resulting solutions were applied onto glass plates and dried by air blowing at room temperature to prepare near-infrared-absorbing filters as samples.

—Light Resistance Test—

The samples obtained above were irradiated for 3 days with 95,000-lux light from a xenon lamp, and the spectral absorption maximum absorption ($\gamma^1$) of the compound (XII-6) after irradiation relative to the spectral absorption maximum absorption ($\gamma^0$) of the compound before irradiation was measured with U-4100 spectrophotometer (manufactured by Hitachi High Technologies) to determine the residual degree ($\gamma^1/\gamma^0$) which was then used as an indicator for evaluating light resistance. A higher residual degree is indicative of higher light resistance.

TABLE 1

| | Compound (I-a) | | |
|---|---|---|---|
| Test No. | Structure | Molar ratio to (XII-6) | Light resistance | Remarks |
| 100 | Not added | | 0.09 | Comparative Example |
| 101 | I-1-1 | 0.01 | 0.1 | The invention |
| 102 | I-1-1 | 0.05 | 0.11 | The invention |
| 103 | I-1-1 | 0.1 | 0.42 | The invention |
| 104 | I-1-1 | 0.3 | 0.56 | The invention |
| 105 | I-1-1 | 0.5 | 0.59 | The invention |
| 106 | I-1-1 | 1 | 0.63 | The invention |
| 107 | I-1-3 | 0.01 | 0.11 | The invention |
| 108 | I-1-3 | 0.05 | 0.12 | The invention |
| 109 | I-1-3 | 0.1 | 0.36 | The invention |
| 110 | I-1-3 | 0.3 | 0.49 | The invention |
| 111 | I-1-3 | 0.5 | 0.55 | The invention |
| 112 | I-1-3 | 1 | 0.6 | The invention |
| 113 | I-1-21 | 0.01 | 0.1 | The invention |
| 114 | I-1-21 | 0.05 | 0.12 | The invention |
| 115 | I-1-21 | 0.1 | 0.35 | The invention |
| 116 | I-1-21 | 0.3 | 0.53 | The invention |
| 117 | I-1-21 | 0.5 | 0.58 | The invention |
| 118 | I-1-21 | 1 | 0.59 | The invention |
| 119 | I-2-1 | 0.01 | 0.1 | The invention |
| 120 | I-2-1 | 0.05 | 0.11 | The invention |

TABLE 2

| | Compound (I-a) | | |
|---|---|---|---|
| Test No. | Structure | Molar ratio to (XII-6) | Light resistance | Remarks |
| 121 | I-2-1 | 0.1 | 0.27 | The invention |
| 122 | I-2-1 | 0.3 | 0.43 | The invention |
| 123 | I-2-1 | 0.5 | 0.48 | The invention |
| 124 | I-2-1 | 1 | 0.49 | The invention |
| 125 | I-3-2 | 0.01 | 0.1 | The invention |
| 126 | I-3-2 | 0.05 | 0.11 | The invention |
| 127 | I-3-2 | 0.1 | 0.27 | The invention |
| 128 | I-3-2 | 0.3 | 0.33 | The invention |
| 129 | I-3-2 | 0.5 | 0.37 | The invention |
| 130 | I-3-2 | 1 | 0.38 | The invention |
| 131 | I-4-6 | 0.01 | 0.1 | The invention |
| 132 | I-4-6 | 0.05 | 0.11 | The invention |
| 133 | I-4-6 | 0.1 | 0.25 | The invention |
| 134 | I-4-6 | 0.3 | 0.38 | The invention |
| 135 | I-4-6 | 0.5 | 0.42 | The invention |
| 136 | I-4-6 | 1 | 0.46 | The invention |

As shown in Tables 1 to 2, any samples of the invention show higher light resistance than that of the comparative samples. After the test, the samples of the invention when checked with eyes showed a paler brown color than that of the comparative samples.

Example 2

Preparation of Near-Infrared-Absorbing Filter

Hundred ml of chloroform was added to 10 g of polystyrene, a luminescent agent (compound (I-a)) in the amounts shown in Table 3 or 4, and 0.1 g of near-infrared-absorbing compound (compound (XII-a)), the resultant was stirred at 40° C. for 15 minutes to dissolve the component in the solvent, and the resulting solutions were applied onto glass plates and dried by air blowing at room temperature to prepare near-infrared-absorbing filters as samples.

—Light Resistance Test—

The samples obtained above were irradiated for 3 days with 95,000-lux light from a xenon lamp, and the spectral absorption maximum absorption ($\gamma^1$) of the compound (XII-a) after irradiation relative to the spectral absorption maximum absorption ($\gamma^0$) of the compound before irradiation was measured with U-4100 spectrophotometer (manufactured by Hitachi High Technologies) to determine the residual degree ($\gamma^1/\gamma^0$) which is then used as an indicator for evaluating light resistance. A higher residual degree is indicative of higher light resistance.

TABLE 3

| | Compound (I-a) | | | | |
|---|---|---|---|---|---|
| Test No. | Structure | Molar ratio to (XII-a) | Compound (XII-a) Structure | Light resistance | Remarks |
| 100 | Not added | | XII-11 | 0.1 | Comparative Example |
| 101 | I-1-1 | 0.01 | XII-11 | 0.11 | The invention |
| 102 | I-1-1 | 0.05 | XII-11 | 0.12 | The invention |
| 103 | I-1-1 | 0.1 | XII-11 | 0.33 | The invention |
| 104 | I-1-1 | 0.3 | XII-11 | 0.36 | The invention |
| 105 | I-1-1 | 0.5 | XII-11 | 0.4 | The invention |
| 106 | I-1-1 | 1 | XII-11 | 0.41 | The invention |
| 107 | I-2-3 | 0.01 | XII-11 | 0.12 | The invention |
| 108 | I-2-3 | 0.05 | XII-11 | 0.14 | The invention |
| 109 | I-2-3 | 0.1 | XII-11 | 0.26 | The invention |
| 110 | I-2-3 | 0.3 | XII-11 | 0.28 | The invention |
| 111 | I-2-3 | 0.5 | XII-11 | 0.3 | The invention |
| 112 | I-2-3 | 1 | XII-11 | 0.31 | The invention |
| 113 | Not added | | XII-16 | 0.08 | Comparative Example |
| 114 | I-1-4 | 0.01 | XII-16 | 0.1 | The invention |
| 115 | I-1-4 | 0.05 | XII-16 | 0.11 | The invention |
| 116 | I-1-4 | 0.1 | XII-16 | 0.28 | The invention |
| 117 | I-1-4 | 0.3 | XII-16 | 0.33 | The invention |
| 118 | I-1-4 | 0.5 | XII-16 | 0.39 | The invention |
| 119 | I-1-4 | 1 | XII-16 | 0.44 | The invention |
| 120 | I-3-6 | 0.01 | XII-11 | 0.11 | The invention |

TABLE 4

| | Compound (I-a) | | | | |
|---|---|---|---|---|---|
| Test No. | Structure | Molar ratio to (XII-a) | Compound (XII-a) Structure | Light resistance | Remarks |
| 121 | I-3-6 | 0.05 | XII-11 | 0.12 | The invention |
| 122 | I-3-6 | 0.1 | XII-11 | 0.2 | The invention |
| 123 | I-3-6 | 0.3 | XII-11 | 0.26 | The invention |
| 124 | I-3-6 | 0.5 | XII-11 | 0.34 | The invention |
| 125 | I-3-6 | 1 | XII-11 | 0.41 | The invention |

TABLE 4-continued

| | Compound (I-a) | | | | |
|---|---|---|---|---|---|
| Test No. | Structure | Molar ratio to (XII-a) | Compound (XII-a) Structure | Light resistance | Remarks |
| 126 | Not added | | XII-17 | 0.11 | Comparative Example |
| 127 | I-1-7 | 0.01 | XII-17 | 0.13 | The invention |
| 128 | I-1-7 | 0.05 | XII-17 | 0.16 | The invention |
| 129 | I-1-7 | 0.1 | XII-17 | 0.19 | The invention |
| 130 | I-1-7 | 0.3 | XII-17 | 0.24 | The invention |
| 131 | I-1-7 | 0.5 | XII-17 | 0.29 | The invention |
| 132 | I-1-7 | 1 | XII-17 | 0.36 | The invention |
| 133 | I-4-8 | 0.01 | XII-11 | 0.12 | The invention |
| 134 | I-4-8 | 0.05 | XII-11 | 0.12 | The invention |
| 135 | I-4-8 | 0.1 | XII-11 | 0.22 | The invention |
| 136 | I-4-8 | 0.3 | XII-11 | 0.39 | The invention |
| 137 | I-4-8 | 0.5 | XII-11 | 0.43 | The invention |
| 138 | I-4-8 | 1 | XII-11 | 0.48 | The invention |

As shown in Tables 3 to 4, any samples of the invention wherein the compound (XII-2) was changed and used in combination with the compound (I-a) as the luminescent agent show higher light resistance than that of the comparative samples. After the test, the samples of the invention when checked with eyes showed a paler brown color than that of the comparative samples.

When the compound (I-a) was irradiated with an ultraviolet (UV) light having a wavelength of 254 nm in the above examples, a blue fluorescence was observed.

In the samples shown in Tables 1 to 4, the samples (of the invention) wherein the near-infrared-absorbing compound was used in combination with the compound (I-a) i.e. the luminescent agent showed a paler color than that of the comparative samples wherein the compound (XII-a) only was contained, thus indicating excellent invisibility upon checking with eyes.

What is claimed is:

1. A near-infrared-absorbing material comprising: at least one luminescent agent selected from the group consisting of the following compounds I-1-1 to I-1-25, I-2-4, I-2-6, I-2-8 to I-2-15, I-3-2, I-3-4, I-3-5, I-3-9 to I-3-15, I-4-3, I-4-5 and I-4-7 to I-4-10, and at least one near-infrared-absorbing compound obtained by oxidizing a compound represented by the following formula (II):

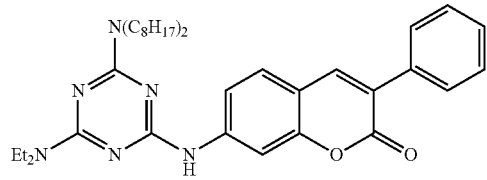
(I-1-1)

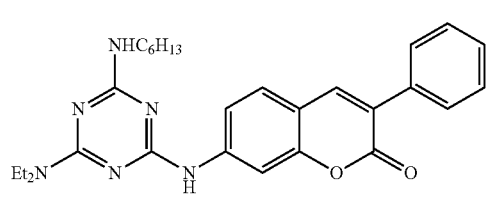
(I-1-2)

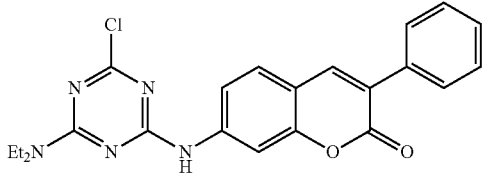
(I-1-3)

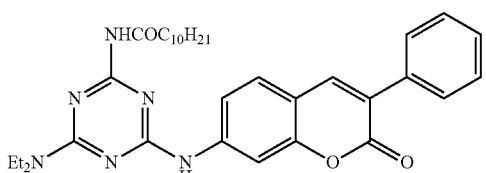
(I-1-4)

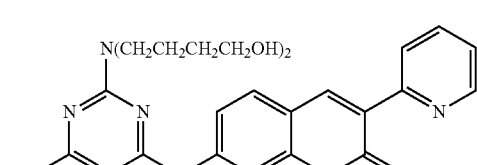
(I-1-5)

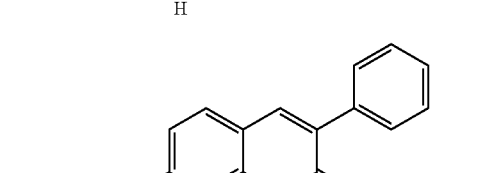
(I-1-6)

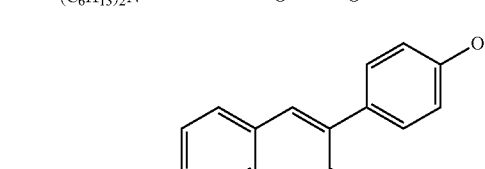
(I-1-7)

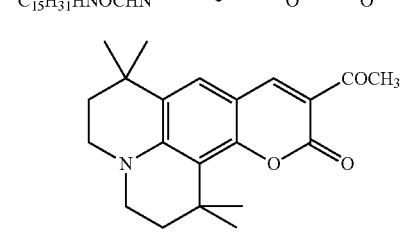
(I-1-8)

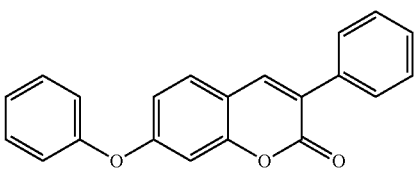
(I-1-9)

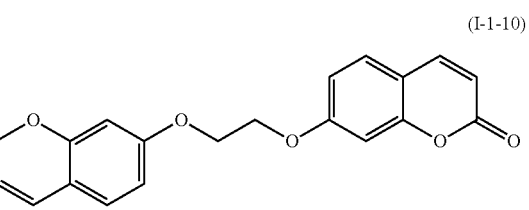
(I-1-10)

(I-1-11) 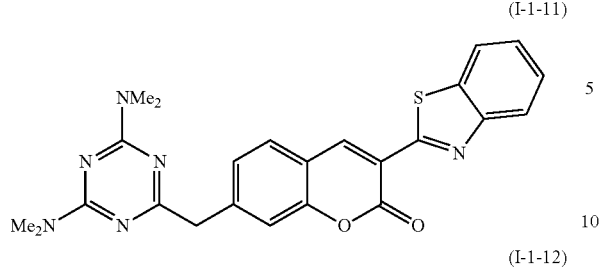
(I-1-12) 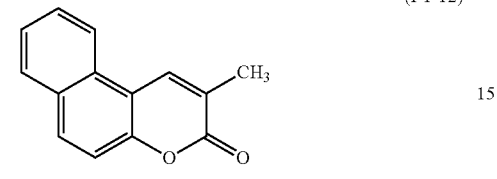
(I-1-13) 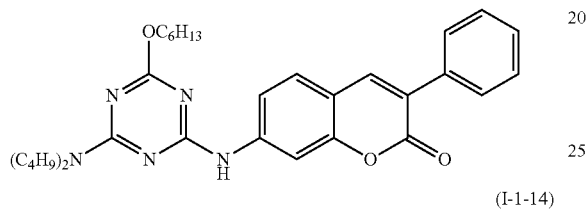
(I-1-14) 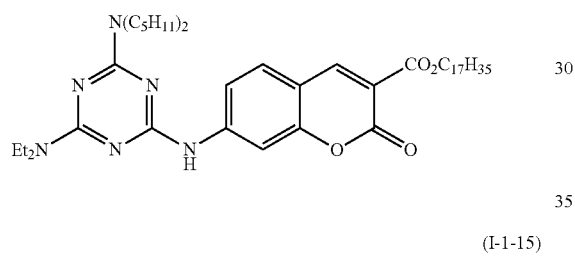
(I-1-15) 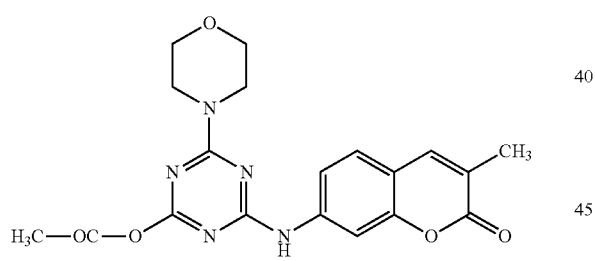
(I-1-16) 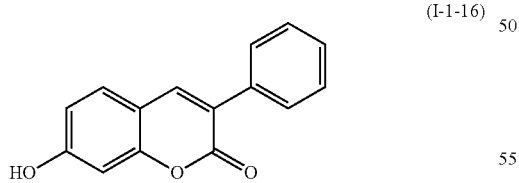
(I-1-17) 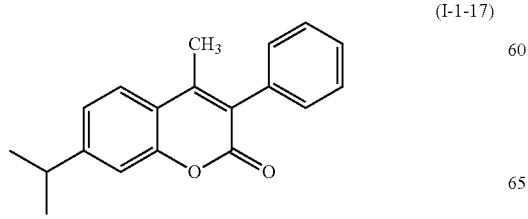
(I-1-18) 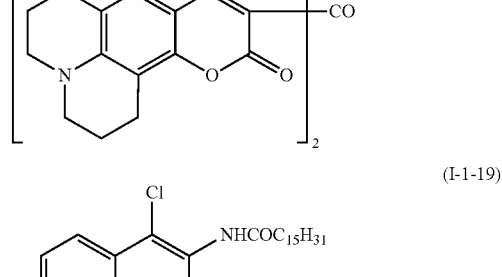
(I-1-19) 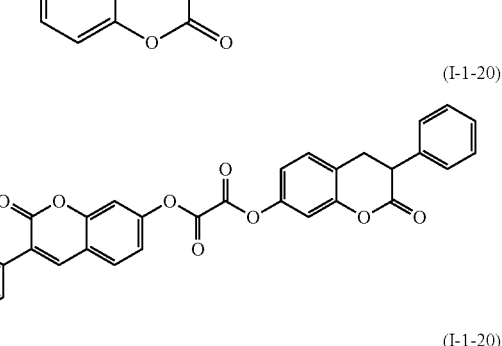
(I-1-20) 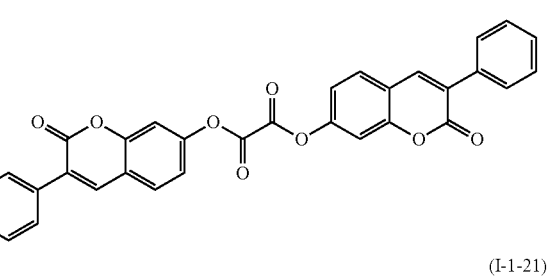
(I-1-20) 
(I-1-21) 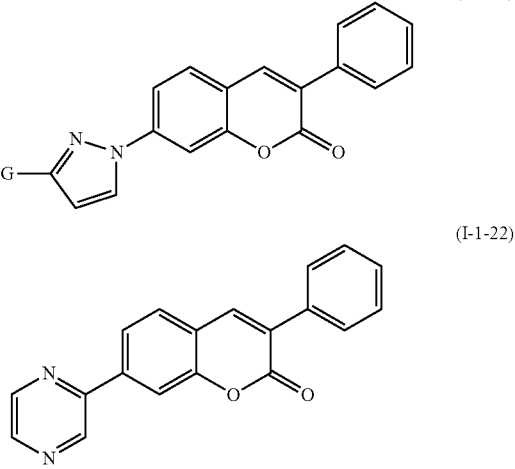
(I-1-22) 
(I-1-23) 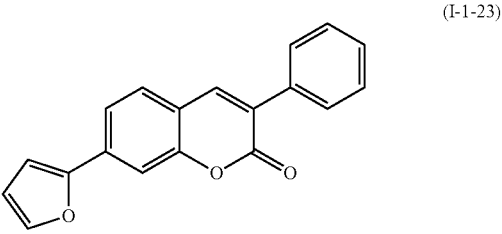

(I-1-24)
(I-1-25)
(I-2-4)
(I-2-6)
(I-2-8)
(I-2-9)
(I-2-10)
(I-2-11)
(I-2-12)
(I-2-13)
(I-2-14)
(I-2-15)
(I-3-2)

(I-3-4)
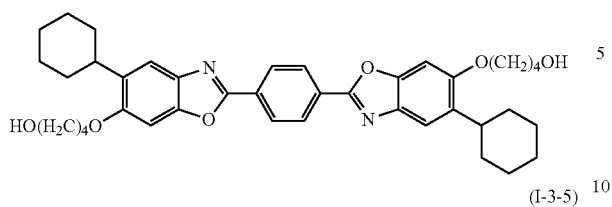
(I-3-5)
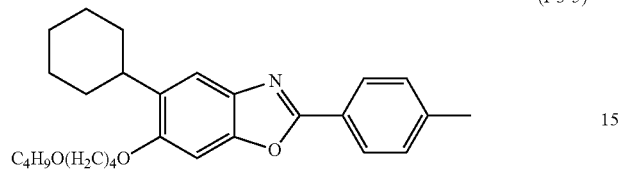
(I-3-9)
(I-3-10)
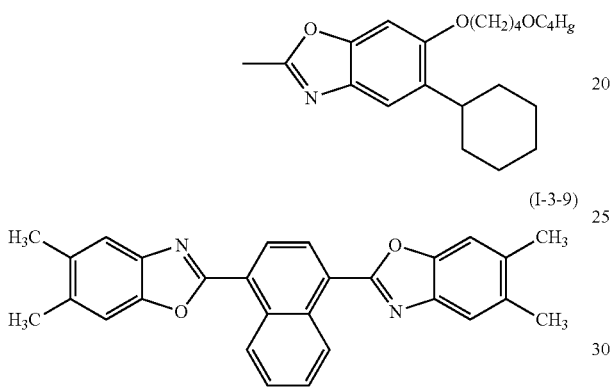
(I-3-11)
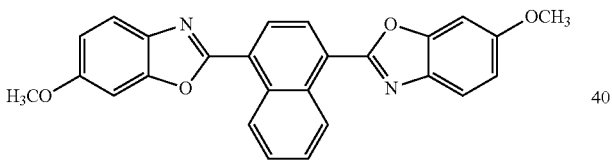
(I-3-12)
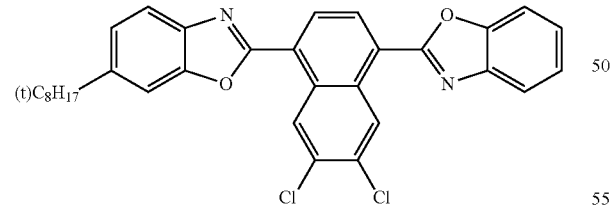
(I-3-13)
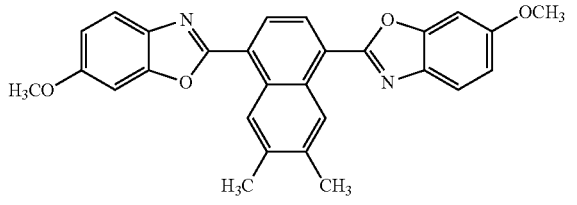
(I-3-14)
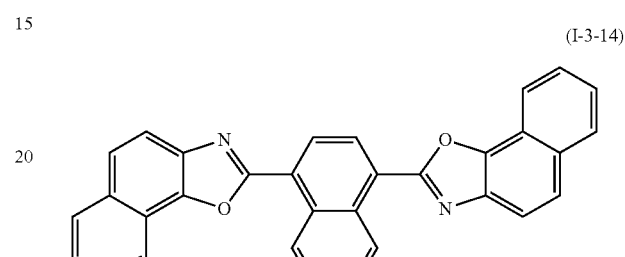
(I-3-15)
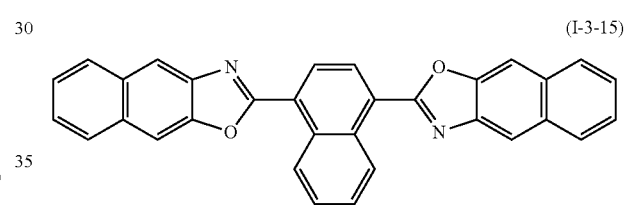
(I-4-3)
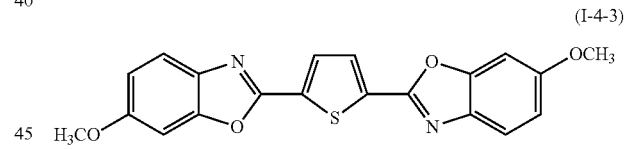
(I-4-5)
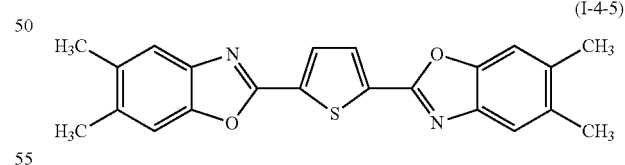
(I-4-7)
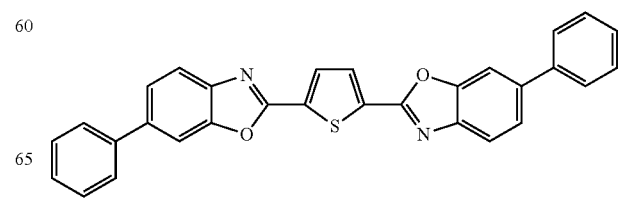

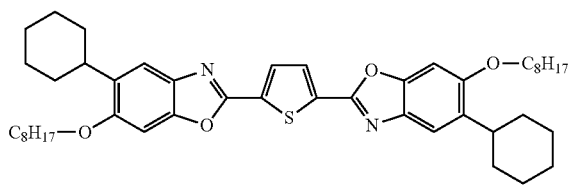
(I-4-8)

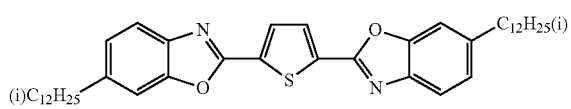
(I-4-9)

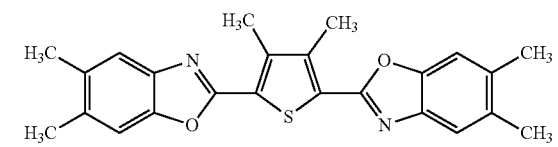
(I-4-10)

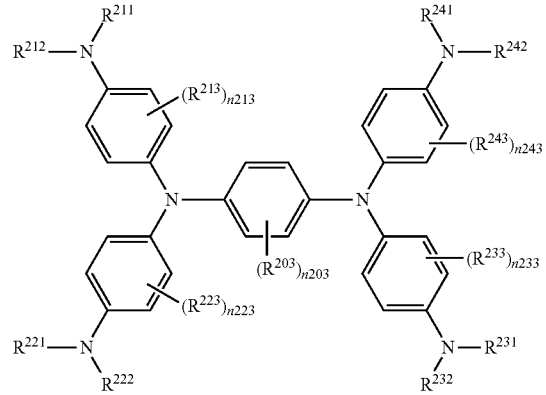
Formula (II)

wherein $R^{211}$, $R^{212}$, $R^{221}$, $R^{222}$, $R^{231}$, $R_{232}$, $R^{241}$ and $R^{242}$ each independently represent a hydrogen atom, an aliphatic group or an aromatic group, $R^{203}$, $R^{213}$, $R^{223}$, $R^{233}$ and $R^{243}$ each independently represent a substituent group, and $n_{203}$, $n_{213}$, $n_{223}$, $n_{233}$ and $n_{243}$ each independently represent an integer from 0 to 4.

2. The near-infrared-absorbing material of claim 1, wherein the near-infrared-absorbing compound is a diimonium salt compound represented by the following formula (XII-1):

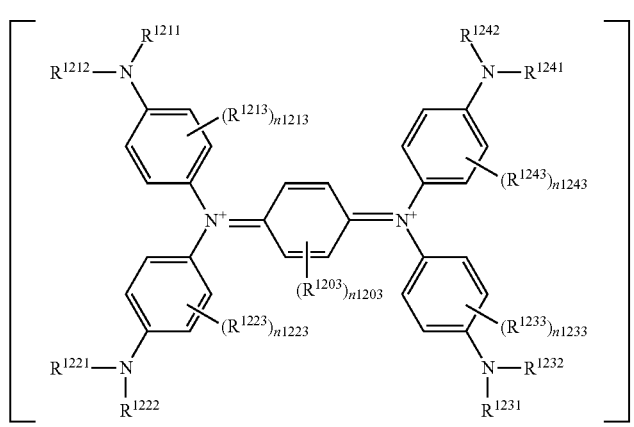
Formula (XII-1)

wherein $R^{1211}$, $R^{1212}$, $R^{1221}$, $R^{1222}$, $R^{1231}$, $R^{1232}$, $R^{1241}$, and $R^{1242}$ each independently represent a hydrogen atom, an aliphatic group or an aromatic group, $R^{1203}$, $R^{1213}$, $R^{1223}$, $R^{1233}$, and $R^{1243}$ each independently represent a substituent group; $n_{1203}$, $n_{1213}$, $n_{1223}$, $n_{1233}$ and $n_{1243}$ each independently represent an integer from 0 to 4; X represents a monovalent or divalent anion; $n_{1253}$ represents 1 or 2; and the product of $n_{1253}$ multiplied by the valence of X is 2.

3. The near-infrared-absorbing material of claim 1, wherein the molar ratio of the luminescent agent to the near-infrared-absorbing compound is 0.05 or more.

4. The near-infrared-absorbing material of claim 2, wherein the molar ratio of the luminescent agent to the near-infrared-absorbing compound is 0.05 or more.

5. The near-infrared-absorbing material of claim 1, wherein the at least one near-infrared-absorbing compound is a diimonium salt compound represented by the following formula (XII-1):

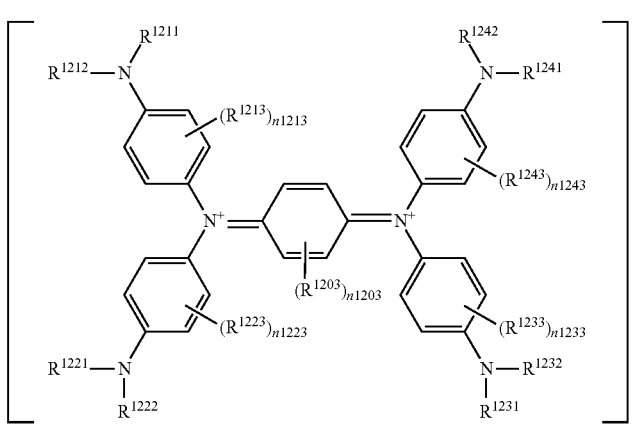

Formula (XII-1)

•n₁₂₅₃(X)

wherein $R^{1211}$, $R^{1212}$, $R^{1221}$, $R^{1222}$, $R^{1231}$, $R^{1232}$, $R^{1241}$, and $R^{1242}$ each independently represent an alkenyl group, an alkynly group, or an aryl group; $R^{1203}$, $R^{1213}$, $R^{1223}$, $R^{1233}$, and $R^{1243}$ each independently represent a substituent group; $n_{1203}$, $n_{1213}$, $n_{1223}$, $n_{1233}$ and $n_{1243}$ each independently represent an integer from 0 to 4; X represents a monovalent or divalent anion; $n_{1253}$ represents 1 or 2; and the product of $n_{1253}$ multiplied by the valence of X is 2.

6. The near-infrared-absorbing material of claim 1, wherein the at least one near-infrared compound is obtained by oxidizing a compound selected from the group consisting of the following compounds II-23, II-24, II-25, II-26, II-27, II-28, II-29, and II-30:

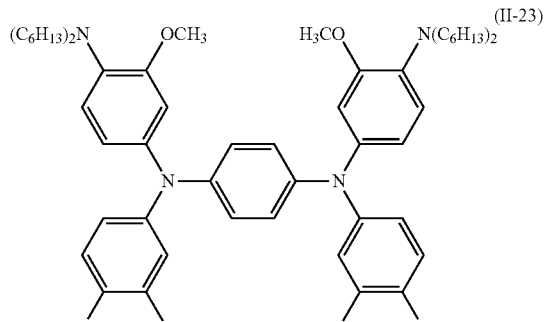

(II-23)

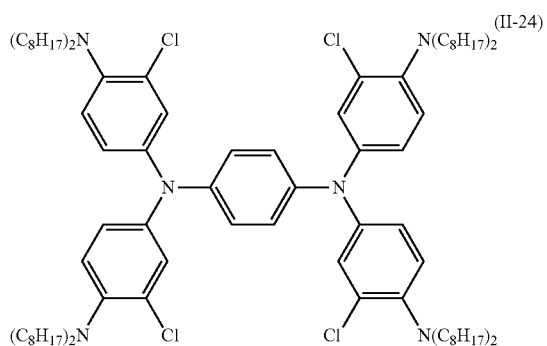

(II-24)

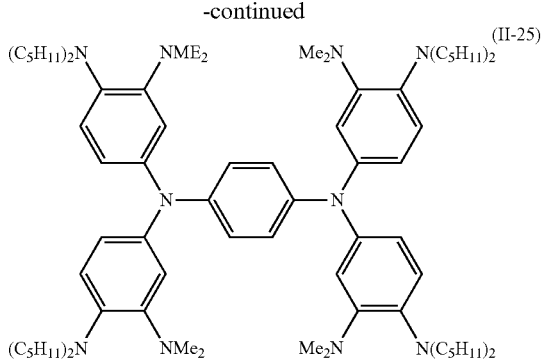

(II-25)

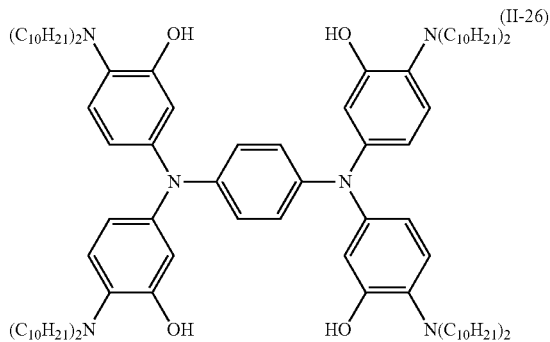

(II-26)

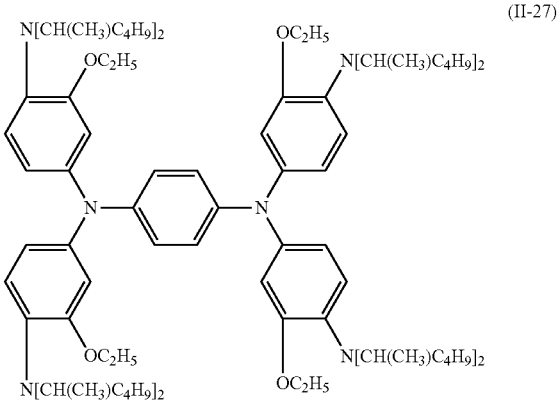

(II-27)

7. The near-infrared-absorbing material of claim 2, wherein the diimonium salt compound is selected from the group consisting of the following compounds XII-16, XII-17, XII-18, XII-20, XII-22, XII-23, XII-24, XII-27, and XII-30:

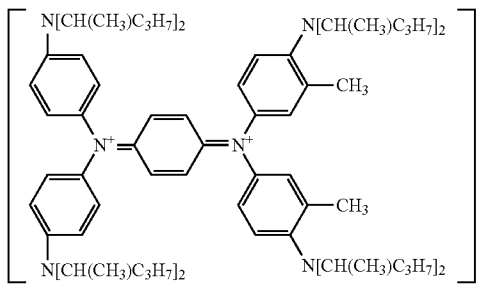
(XII-23)

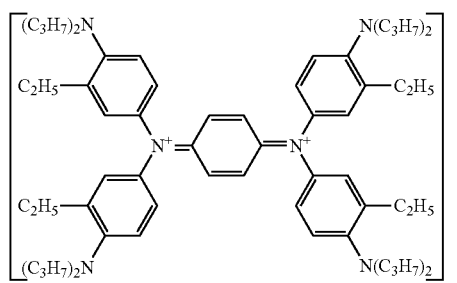
(XII-24)

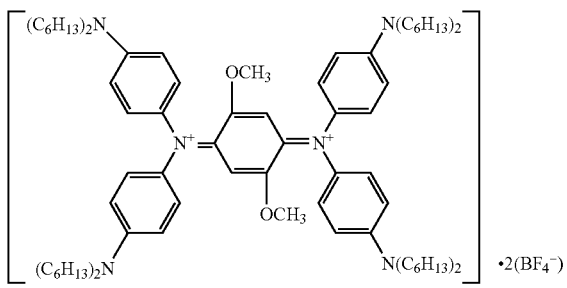
(XII-27)

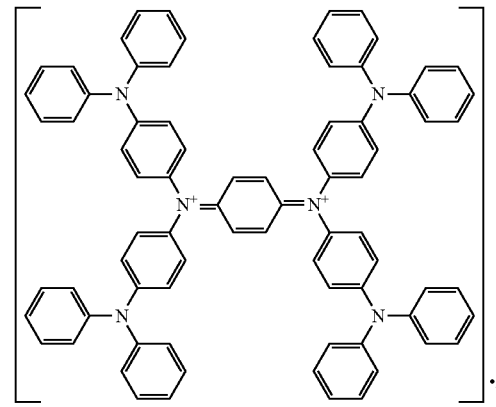
(XII-30)

8. The near-infrared-absorbing material of claim 1 having a shape of a film.

9. The near-infrared-absorbing material of claim 8, wherein the molar ratio of the luminescent agent to the near-infrared-absorbing material compound is 0.05 or more.

10. The near-infrared-absorbing material of claim 2 having a shape of a film.

11. The near-infrared-absorbing material of claim 10, wherein the molar ratio of the luminescent agent to the near-infrared-absorbing material compound is 0.05 or more.

12. A near-infrared-absorbing filter having a shape of a film and comprising the near-infrared-absorbing material of claim 1.

13. A near-infrared-absorbing filter comprising a substrate and a near-infrared-absorbing layer provided on the substrate, the near-infrared-absorbing layer comprising the near-infrared-absorbing material of claim 1.

14. The near-infrared-absorbing filter of claim 13, wherein the near-infrared-absorbing compound is a diimonium salt compound represented by the following formula (XII-1):

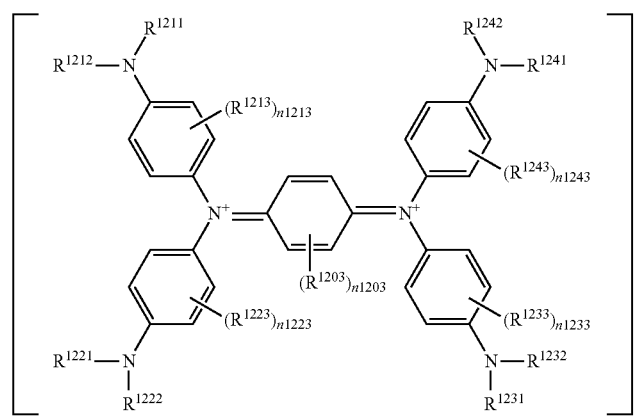
Formula (XII-1)

wherein $R^{1211}$, $R^{1212}$, $R^{1221}$, $R^{1222}$, $R^{1231}$, $R^{1232}$, $R^{1241}$, and $R^{1242}$ each independently represent a hydrogen atom, an aliphatic group or an aromatic group, $R^{1203}$, $R^{1213}$, $R^{1223}$, $R^{1233}$, and $R^{1243}$ each independently represent a substituent group; $n_{1203}$, $n_{1213}$, $n_{1223}$, $n_{1233}$ and $n_{1243}$ each independently represent an integer from 0 to 4; X represents a monovalent or divalent anion; $n_{1253}$ represents 1 or 2; and the product of $n_{1253}$ multiplied by the valence of X is 2.

15. A structure body comprising a substrate and a near-infrared-absorbing layer provided on the substrate, the near-infrared-absorbing layer comprising the near-infrared-absorbing material of claim 1.

16. A structure body comprising a substrate and a near-infrared-absorbing layer provided on the substrate, the near-infrared-absorbing layer comprising the near-infrared-absorbing material of claim 3.

17. The structure body of claim 15, wherein the molar ratio of the luminescent agent to the near-infrared-absorbing material compound is 0.05 or more.

18. The structure body of claim 16, wherein the molar ratio of the luminescent agent to the near-infrared-absorbing material compound is 0.05 or more.

* * * * *